United States Patent
Clark et al.

(10) Patent No.: US 10,113,414 B2
(45) Date of Patent: Oct. 30, 2018

(54) MULTIPLE MAGNETIC SENSOR RANGING METHOD AND SYSTEM

(75) Inventors: Brian Clark, Sugar Land, TX (US); Jan Stefan Morley, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 1071 days.

(21) Appl. No.: 12/996,957

(22) PCT Filed: May 15, 2009

(86) PCT No.: PCT/US2009/044083
§ 371 (c)(1),
(2), (4) Date: Dec. 8, 2010

(87) PCT Pub. No.: WO2009/151867
PCT Pub. Date: Dec. 17, 2009

(65) Prior Publication Data
US 2011/0088890 A1 Apr. 21, 2011

Related U.S. Application Data

(60) Provisional application No. 61/088,035, filed on Aug. 12, 2008, provisional application No. 61/061,542, filed on Jun. 13, 2008.

(51) Int. Cl.
*E21B 47/022* (2012.01)
*E21B 47/024* (2006.01)
(Continued)

(52) U.S. Cl.
CPC ...... *E21B 47/02216* (2013.01); *E21B 47/022* (2013.01); *E21B 47/024* (2013.01); *G01B 7/14* (2013.01); *G01B 7/30* (2013.01)

(58) Field of Classification Search
CPC .......... E21B 44/00; E21B 7/04; E21B 47/022; E21B 47/024; E21B 47/12; E21B 47/00;
(Continued)

(56) References Cited

U.S. PATENT DOCUMENTS 3,731,752 A 5/1973 Schad
4,700,142 A 10/1987 Kuckes
(Continued)

FOREIGN PATENT DOCUMENTS

| CA | 2490953 A1 * | 6/2006 |
| WO | 1994011762 | 5/1994 |
| WO | WO2010008634 A1 | 1/2010 |

OTHER PUBLICATIONS

International Search Report and Written Opinion issued in International Patent application PCT/US2009/044083, dated Dec. 31, 2009. 8 pages.
(Continued)

*Primary Examiner* — Caroline N Butcher

(57) ABSTRACT

Methods for drilling a second well in a spatial relationship to a first well include positioning a magnetic field source in a first well or borehole and deploying at least two magnetometers in a second well or borehole. The magnetometers are separated by a known distance and each measure the magnetic field created by the magnetic field source that is located in the first borehole. The magnetic field measurements are used to calculate the locations of the two magnetometers with respect to the magnetic field source. The two locations define the axis of the second borehole with respect to the magnetic field source in the first borehole.

15 Claims, 23 Drawing Sheets

(51) Int. Cl.
*G01B 7/14* (2006.01)
*G01B 7/30* (2006.01)

(58) Field of Classification Search
CPC ........ E21B 43/30; E21B 47/09; E21B 43/305; E21B 47/122
See application file for complete search history.

(56) References Cited

U.S. PATENT DOCUMENTS

| | | | |
|---|---|---|---|
| 4,710,708 A | | 12/1987 | Rorden et al. |
| 5,485,089 A | * | 1/1996 | Kuckes .................. 324/346 |
| 5,589,775 A | * | 12/1996 | Kuckes .................. 324/346 |
| 5,923,170 A | | 7/1999 | Kuckes |
| RE36,569 E | * | 2/2000 | Kuckes .................. 324/346 |
| 8,063,641 B2 | | 11/2011 | Clark et al. |
| 2006/0131013 A1 | * | 6/2006 | McElhinney .......... 166/250.01 |
| 2007/0247330 A1 | | 10/2007 | Clark |

OTHER PUBLICATIONS

International Preliminary Report on Patentability issued in International Patent application PCT/US2009/044083, dated Dec. 12, 2010. 6 pages.
Grills, Tracy L., Magnetic Ranging Technologies for Drilling Steam Assisted Gravity Drainage Wells Pairs and Unique Well Geometries. SPE79005. SPE International Thermal Operations and Heavy Oil Symposium and International Horizontal Well Technology Conference, Nov. 4-7, 2002, Calgary, Alberta, Canada. 8 pages.
Kuckes et al., New Electromagnetic Surveying/Ranging Method for Drilling Parallel Horizontal Twin Wells. SPE 27466, spe Drilling and Completion, vol. 11, Issue 2, Jun. 1996. 6 pages.
Examination Report issued in Canadian Patent Application No. 2727610 dated Oct. 22, 2015. 4 pages.
First Examination Report issued in Australian Patent Application No. 2009257857 dated Dec. 5, 2011. 2 pages.
Second Examination Report issued in Australian Patent Application No. 2009257857 dated Feb. 22, 2013. 2 pages.

* cited by examiner

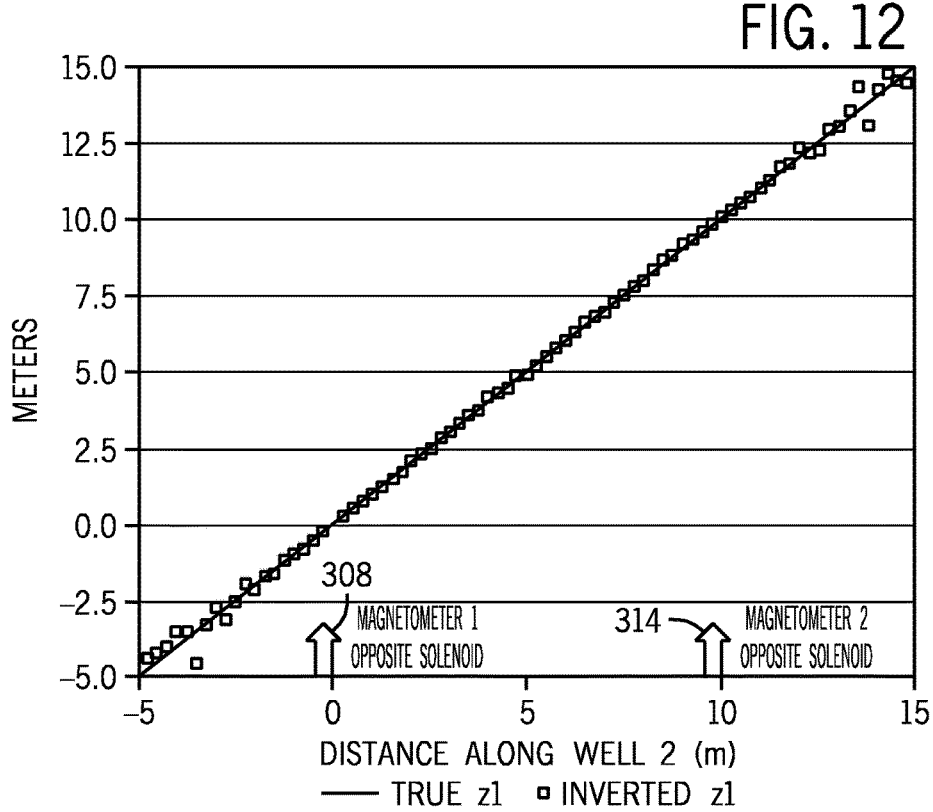
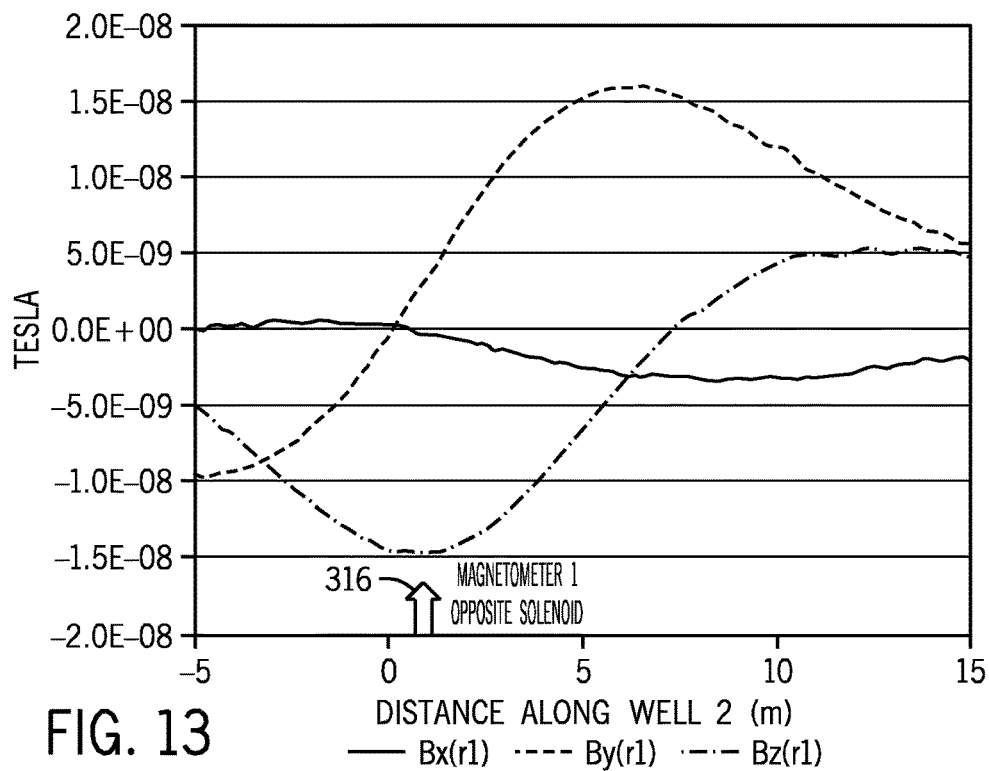

— ACTUAL x' TRAJECTORY    □ ESTIMATED x' POSITION
---- x' TRAJECTORY FIT TO DATA

— ACTUAL y' TRAJECTORY   □ ESTIMATED y' POSITION
---- y' TRAJECTORY FIT TO DATA

MULTIPLE MAGNETIC SENSOR RANGING METHOD AND SYSTEM

FIELD OF THE INVENTION

The present invention relates generally to well drilling operations and, more particularly, to a system and method for magnetic ranging to an open borehole or to a cased well.

BACKGROUND OF THE INVENTION

In order to access certain types of hydrocarbons in the earth, it may be necessary or desirable to drill wells or boreholes in a certain spatial relationship with respect to one another. Specifically, it may be desirable to drill a borehole such that it has a specific location relative to a previously drilled borehole. For example, heavy oil may be too viscous in its natural state to be produced from a conventional well, and, thus, an arrangement of cooperative wells and well features may be utilized to produce such oil. Indeed, to produce heavy oil, a variety of techniques may be employed, including, for example, Steam Assisted Gravity Drainage (SAGD), Cross Well Steam Assisted Gravity Drainage (X-SAGD), or Toe to Heel Air Injection (THAI). While SAGD wells generally involve two parallel horizontal wells, X-SAGD and THAI wells generally involve two or more wells located perpendicular to one another.

X-SAGD and THAI techniques function by employing one or more wells for steam injection or air injection, respectively, known as "injector wells." The injector wells pump steam or air into precise locations in a heavy oil formation to heat heavy oil. One or more lower horizontal wells, known as "producer wells," collect the heated heavy oil. For an X-SAGD well pair including an injector well and a producer well, the injector well is a horizontal well located above and oriented perpendicular to the producer well. In contrast, for a THAI well pair including an injector well and a producer well, the injector well is a vertical well located near and oriented perpendicular to the producer well.

Steam or air from an injector well in an X-SAGD or THAI well pair should be injected at a precise point in the heavy oil formation to maximize recovery. Particularly, if steam is injected too near to a point of closest approach between the injector well and the producer well, steam may be shunted out of the formation and into the producer well. Using many conventional techniques, the point of closest approach between the two wells may be difficult to locate or the location of the point of closest approach may be imprecise.

Moreover, the relative distance between the injector and producer wells of an X-SAGD or THAI well pair may affect potential recovery. The wells should be located sufficiently near to one another such that heavy oil heated at the injector well may drain into the producer well. However, if the wells are located too near to one another, steam or air from the injector well may shunt into the producer well, and if the wells are located too far from one another, the heated heavy oil may not extend to the producer well. Using conventional techniques, it may be difficult to accurately drill one well perpendicular to another well.

SAGD may generally involve two parallel wells separated by an approximately constant vertical separation distance (e.g., 4 to 6 m) and an approximately constant transverse horizontal separation distance (e.g., within 1 m) over a horizontal distance of roughly 500 m to 1500 m. The upper well in a SAGD well pair may be known as an "injector well." The injector well may inject superheated steam into a heavy oil zone formation, creating a steam chamber to heat the heavy oil contained therewithin. The lower well in a SAGD well pair may be known as a "producer well." When the heated heavy oil becomes less viscous, gravity may pull the oil into the producer well below, from which the oil may be extracted.

Conventional measurement while drilling (MWD) survey data may not provide sufficient accuracy to maintain a consistent separation distance between the injector well and the producer well. Indeed, the direction of a horizontal well may be measured and controlled to approximately +/−3°, and the inclination may be measured and controlled to approximately +/−1°, using conventional MWD sensors and good directional steering practices. However, such relatively small angles may produce large errors in the position of a long horizontal well. For example, a horizontal well with a 1000 meter length having a 3° drift may have a 52 meter lateral error at the toe of the well. If the same horizontal well has a 1° drift in inclination, the well may also have a 17 meter vertical error.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

One method in accordance with exemplary embodiments includes producing a magnetic field with a magnetic field source positioned in the first well, producing a first output from a first magnetic field sensor subsystem for sensing directional magnetic field components, and producing a second output from a second magnetic field sensor subsystem for sensing directional magnetic field components. The first and second magnetic field sensor subsystems are positioned a distance apart from one another within the second well. Further, the first and second outputs are responsive to the magnetic field produced by the magnetic field source.

One method in accordance with exemplary embodiments includes a method for drilling of a second well in a specified spatial relationship with respect to a first well. The method may include providing, in the first well, a magnetic field source, and providing, in the second well, a directional drilling subsystem and a plurality of magnetometers for sensing directional magnetic field components. The method may also include activating the magnetic field source to produce a magnetic field, and producing at least two outputs from the plurality of magnetometers, wherein each of the at least two outputs is produced by a different one of the plurality of magnetometers, the at least two outputs being responsive to the magnetic field produced by the magnetic field source. Further, the method may include determining a geometric relationship of the second well with respect to the first well as a function of the at least two outputs, producing directional drilling control signals as a function of the determined geometric relationship, and implementing a directional drilling increment of the second well in the directional drilling system with the directional drilling control signals.

A system in accordance with an exemplary embodiment may include a system for monitoring a geometric relationship of a second well with respect to a first well. The exemplary system may include a sensing subsystem capable of being moved along the second well, the sensing subsystem comprising a plurality of spaced apart magnetometers capable of sensing directional magnetic field components, wherein each of the plurality of magnetometers is capable of producing an output responsive to a magnetic field produced by a magnetic field source. Further, the system may include a processor capable of determining the geometric relationship of the second well with respect to the first well from a combination of the output produced by each of the plurality of magnetometers.

A system in accordance with an exemplary embodiment may include a system for magnetic ranging to an open borehole or to a cased well. The exemplary system may include a magnetic field source capable of being located in a first borehole. Further, the system may include an array of magnetometer systems capable of being located in a second borehole, wherein the magnetometer systems are located a known distance apart along the array and are each capable of measuring the magnetic field. The system may also include a processor capable of calculating a location of the magnetic field source based on the known distance and measurements of the magnetic field taken by an adjacent pair of magnetometer systems within the array that are near the magnetic field source.

A system in accordance with another exemplary embodiment may include a magnetic field sensor system that includes two or more magnetometers that are aligned and spaced a certain distance apart from adjacent magnetometers. A magnetic field source may be placed in a first well, such as in a drilling tool, and the magnetic field sensor system including two or more magnetometers may be placed in a second well. For example, an array of 3-axis magnetometers may be deployed in the second well and connected to the surface by a wireline cable or the like. The magnetometers within the array may be arranged such that there is a known distance between each adjacent magnetometer in the array. Each of the magnetometers may individually be capable of measuring the magnetic field produced by the magnetic field source. Accordingly, magnetic field measurements from adjacent pairs of magnetometers may be used to calculate a relative location of the magnetic field source. In view of this, it may not be necessary to know the exact location of the measurement point along the axis of the first well or the exact location of the magnetometers in the second well. Further, by using an array of magnetometers, it is not necessary to move the magnetic field sensor system for each survey point. Furthermore, exemplary embodiments may provide automated steering of a BHA using data acquired from an adjacent well. In other words, all or a portion of steering a BHA may be achieved without human intervention using systems and methods in accordance with exemplary embodiments.

BRIEF DESCRIPTION OF THE DRAWINGS

Advantages of the invention may become apparent upon reading the following detailed description and upon reference to the drawings in which:

FIGS. 10, 11, and 12 include graphs of the true positions of the first magnetometer and the positions obtained with equations based on example data in accordance with exemplary embodiments;

FIGS. 13 and 14 include graphs of magnetic field measurements versus distance along a well for magnetic field components measured at each of a pair of magnetometers, respectively, in accordance with exemplary embodiments;

DETAILED DESCRIPTION OF SPECIFIC EMBODIMENTS

One or more specific embodiments of the present invention are described below. In an effort to provide a concise description of these embodiments, not all features of an actual implementation are described in the specification. It should be appreciated that in the development of any such, actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following detailed description, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
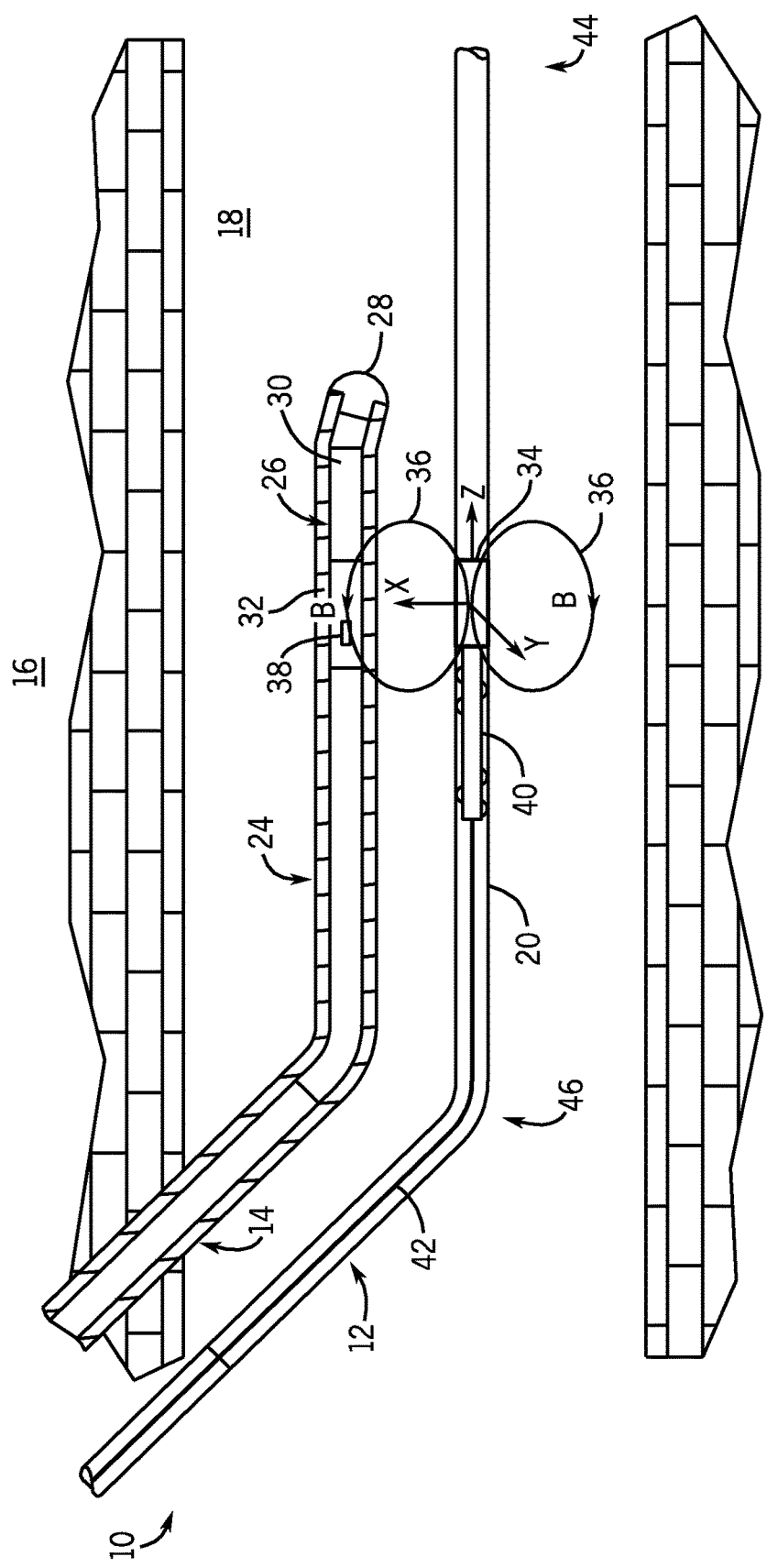
FIG. 1 depicts a traditional well drilling operation involving magnetic ranging while drilling.

FIG. 1 depicts a traditional well drilling operation 10 involving magnetic ranging while drilling. Specifically, the well drilling operation 10 may include the formation of a pair of SAGD wells. Indeed, as illustrated in FIG. 1, an existing first well 12 and a second well 14 in the process of being drilled extend from the surface through a formation 16 into a heavy oil zone 18. The first well 12 is cased with casing 20 (e.g., a slotted or perforated liner) and may eventually function as the producer well of the SAGD pair. As is typical for placement of producer wells, the first well 12 is placed near the bottom of the heavy oil zone 18. Further, as is typical for a SAGD pair, the second well 14 is positioned above the first well 12, and may be used to inject steam into the heavy oil zone 18. For example, the second well 14 may be positioned a vertical distance of 5±1 meters above the essentially horizontal section of the first well 12, and within ±1 meters of the vertical plane defined by the axis of the first well 12. In the illustrated embodiment, a drill string 24 is being used to drill the second well 14. The drill string 24 includes a bottom hole assembly (BHA) 26 having a drill bit 28, a steerable system 30, and a measurement while drilling (MWD) tool 32.

Maintaining the relative positioning between the first well 12 and the second well 14 with any significant precision is generally beyond the capability of conventional procedures that utilize MWD direction and inclination measurement. Accordingly, magnetic ranging is used to determine the distances between and relative positioning of the wells (e.g., the first well 12 and the second well 14). For example, a solenoid 34 may be placed in the first well 12 and energized with current to produce a magnetic field 36 for use in magnetic ranging measurements. The solenoid 34 may include a long magnetic core wrapped with numerous turns of wire.

The magnetic field 36 produced by the solenoid 34 may have a known strength and produce a known field pattern that can be measured in the second well 14. Accordingly, a 3-axis magnetometer 38 mounted in the MWD tool 32 and positioned within the second well 14 may be utilized to make observations of the magnetic field 36. Such observations may facilitate a determination of relative positioning of the first well 12 and the second well 14. It should be noted that the solenoid 34 typically must remain within a certain distance of the MWD tool 32 to properly perform magnetic ranging, which requires movement of the solenoid 34 as drilling progresses. Further, the solenoid 34 generally must be positioned in at least two locations with respect to the MWD tool 32 to acquire a proper measurement. Accordingly, in the illustrated embodiment, a wireline tractor 40 coupled with a cable 42 is utilized to push the solenoid 34 through the first well 12 into different positions relative to the 3-axis magnetometer 38. However, in other embodiments, the solenoid 34 may be pumped down inside tubing, the solenoid 34 may be pushed with coiled tubing, or other techniques may be utilized.

As indicated above, in traditional magnetic ranging procedures, the solenoid 34 is moved to different positions within the first well 12 to facilitate taking measurements from different positions relative to the BHA 26 in the second well 14. The movement of the solenoid 34 between the at least two borehole positions typically requires that the wireline tractor 40 be activated and driven along the wellbore or some other procedure be performed to move the solenoid 34. During such movement of the solenoid 34, the BHA 26 is not drilling. Thus, the actual drilling process is halted periodically when performing a traditional magnetic ranging operation, and drilling is limited to the time between magnetic ranging measurements. Such activity can be time consuming and can waste valuable drilling time. The distance drilled between measurements may depend on a driller's ability to keep the well straight and/or on course. In a typical operation, the BHA 26 in the second well 14 may drill a distance of 10 m to 30 m (e.g., one to three lengths of drill pipe) between measurements.

As indicated above, in traditional approaches that use magnetic ranging, measurements may be taken with the solenoid 34 in different positions within the first well 12. For example, in a first position, a measurement may be taken using the 3-axis magnetometer 38 of the MWD tool 32 to measure the Earth's magnetic field without current in the solenoid 34. Then, a measurement may be taken with the solenoid 34 activated with DC current to produce the magnetic field 36, which adds to the Earth's magnetic field. Next, a measurement may be taken with the DC current in the solenoid 34 reversed. These multiple measurements may be used to subtract a value for the Earth's relatively large magnetic field from the data obtained while passing current through the solenoid 34. The solenoid may then be moved to a second position within the first well 12 by the wireline tractor 40 or another feature for moving the solenoid 34. If the first position was behind of the 3-axis magnetometer 38 of the MWD tool 32 (e.g., closer to the heel 46 of the well), then the second position should be in front of the magnetometer of the MWD tool 32 (e.g., closer to the toe 44 of the well). In the second position, the solenoid 34 may be again activated with DC current, and the MWD tool 32 may make a fourth magnetic field measurement. Next, the DC current may be reversed, and a fifth magnetic field measurement may be made with the MWD tool 32. The five magnetic field measurements may then be transmitted to the surface for processing to determine the position of the 3-axis magnetometer 38 of the MWD tool 32 with respect to the various positions of the solenoid 34, and, thus, the position of the second well 14 relative to the first well 12.

It should be noted that the movement of the solenoid 34 described above typically requires that the tractor 40 be activated and driven along the first well 12, which is time consuming. Further, any errors in measuring the two axial positions of the solenoid 34 or errors in the distance the solenoid 34 moves may introduce errors in the calculated distance between the first and second wells 12, 14. Additionally, since the solenoid 34 is moved from one position to another, the distance the solenoid travels may vary from one magnetic ranging operation to the next. Since the MWD tool 32 may not know how far the solenoid 34 moved, it may not be able to compute the distance to the other well. Accordingly, all five magnetic field measurements may be transmitted to the surface via a telemetry system, which is typically slow, and drilling may not resume until the measurements have been decoded, processed, and so forth. Many of these procedures traditionally involve multiple human operators. For example, driving the tractor 40, activating the solenoid 34, processing survey and magnetic ranging data, calculating relative positions, comparing measures positions with a planned well trajectory, computing course corrections, and down linking steering commands to the steerable system 30 or manually adjusting the direction of a steerable bent sub, may require extensive human activity. Such human activity may add to the cost of the operation, delays, and the possibility of human error.

Exemplary embodiments in accordance with the present invention are directed to methods and systems that are capable of determining a geometric relationship between two wells. For example, one embodiment may be capable of determining distances between two wells and directions from one well to the other. Further, exemplary embodiments may be capable of controlling the position, direction, and inclination of a bottomhole assembly (BHA) drilling an adjacent well. Exemplary embodiments may be utilized in applications relating to SAGD wells and any other system of wells that are to be arranged in close proximity to each other with controlled spacing.

Specifically, exemplary embodiments may utilize a magnetic field source located in a first borehole, and two or more magnetometers (e.g., 3-axis magnetometers) deployed in a second borehole. The magnetometers may be positioned a known distance apart (e.g., a substantially fixed distance apart within a downhole tool), and the magnetometers may each be configured to individually measure the magnetic field created by the magnetic field source that is located in the first borehole. These magnetic field measurements may then be utilized to calculate the locations of each of the two magnetometers with respect to the magnetic field source. The calculated locations may then be used to define the axis of the second borehole with respect to the magnetic field source in the first borehole. Thus, exemplary embodiments may efficiently determine a location of the second borehole with respect to the first borehole, and this may be achieved without a value for the exact location of the measurement point along the axis of the first borehole, the exact location of the magnetometers in the second borehole, or knowledge of the magnetic dipole moment.

Figure 2:
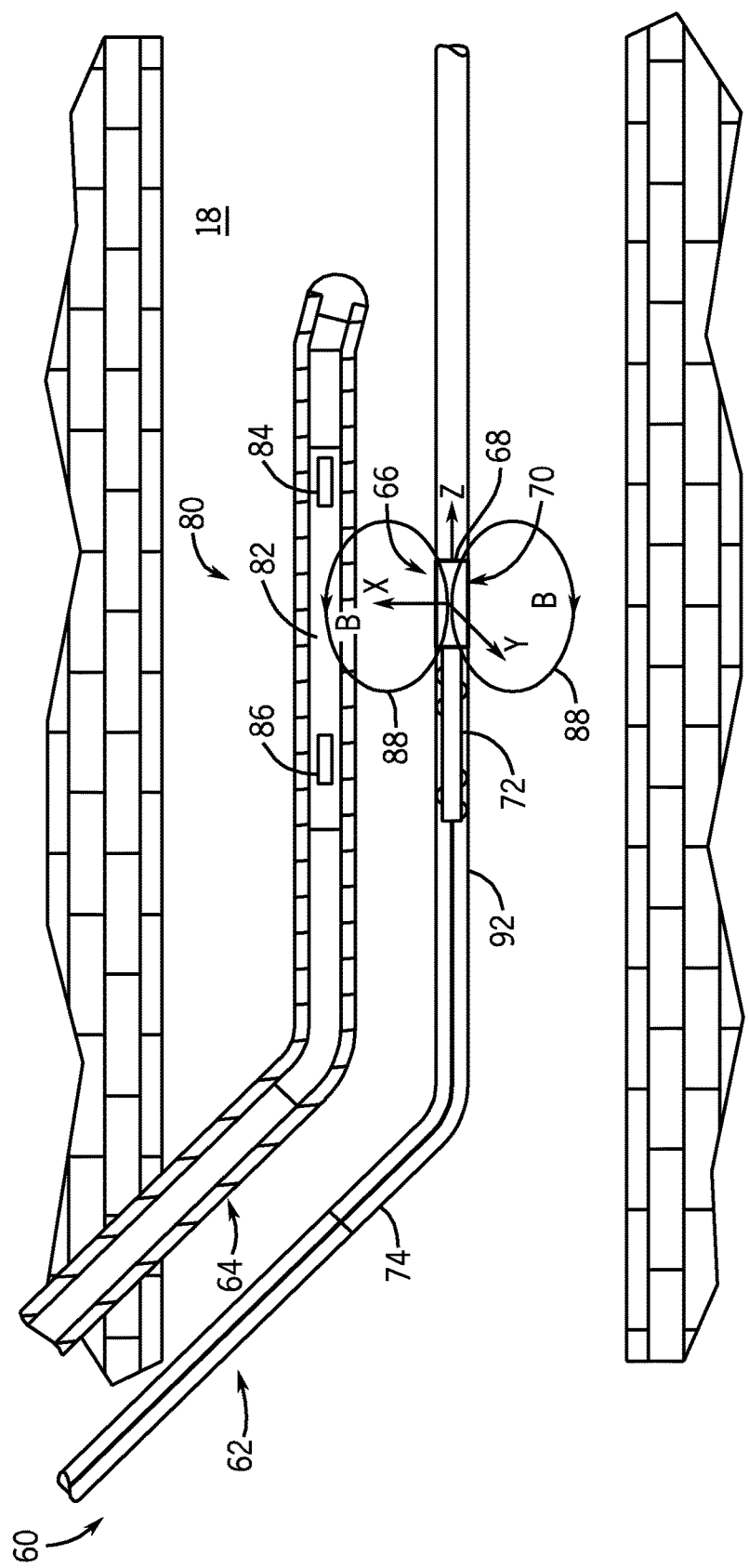
FIG. 2 illustrates a well drilling operation utilizing tools for dual magnetic sensor ranging while drilling in accordance with exemplary embodiments.

FIG. 2 illustrates a well drilling operation 60 including an existing first well 62 and a second well 64 in the process of being drilled in the heavy oil zone 18, wherein the drilling operation 60 is utilizing tools for dual magnetic sensor ranging while drilling in accordance with one embodiment. Specifically, FIG. 2 illustrates a downhole tool 66 with a solenoid 68 that is deployed in the first well 62. In the illustrated embodiment, the solenoid 68 is generally aligned with the borehole axis of the first well 62 (i.e. in the z-direction). The solenoid 68 may be contained in a non-magnetic or non-metallic housing 70 (e.g. a fiberglass housing). The downhole tool 66 may be a wireline logging tool, for example, and may have an electronic cartridge that produces DC currents or low frequency AC currents for the solenoid 68. In some embodiments, the solenoid 68 may be disposed within a MWD tool. It should be noted that the downhole tool 66 can be moved along the borehole of the first well 62 by a wireline tractor 72 coupled with a wireline cable 74. In other exemplary embodiments, the downhole tool 66 may be moved by coiled tubing or by other means.

In the illustrated embodiment, a BHA 80 is disposed within the borehole of the second well 64. The BHA 80 includes an MWD tool 82 that contains a first 3-axis magnetometer 84 and a second 3-axis magnetometer 86, wherein each of the 3-axis magnetometers 84, 86 may be capable of measuring an AC and/or DC magnetic field 88 produced by the solenoid 68. Accordingly, in some embodiments, the solenoid 68 can be driven by an AC current, rather than by a DC current. While present embodiments may use DC magnetic fields, the use of AC magnetic fields may be beneficial because the Earth's DC magnetic field can essentially be entirely suppressed by placing high pass filters on the magnetometer outputs. Since the 50,000 nTesla magnetic field of the Earth is no longer present in the data, much weaker magnetic fields can be accurately measured than is possible for DC magnetic fields. This also can reduce the weight and power requirements for the solenoid 68 and can increase the functional range between the first well 62 and the second well 64. The frequency of the AC current in accordance with some embodiments may generally lie in the range of 1 Hz to 20 Hz (e.g., a frequency of approximately 3 Hz). While present embodiments may include higher frequencies, for frequencies much greater than 20 Hz, the magnetic field may be highly attenuated if the first well has steel casing, such as casing 92), or by drill collar material in the MWD tool 82 when a magnetometer (e.g., one or both of the magnetometers 84, 86) is located inside a drill collar of the MWD tool 82.

Figure 3:
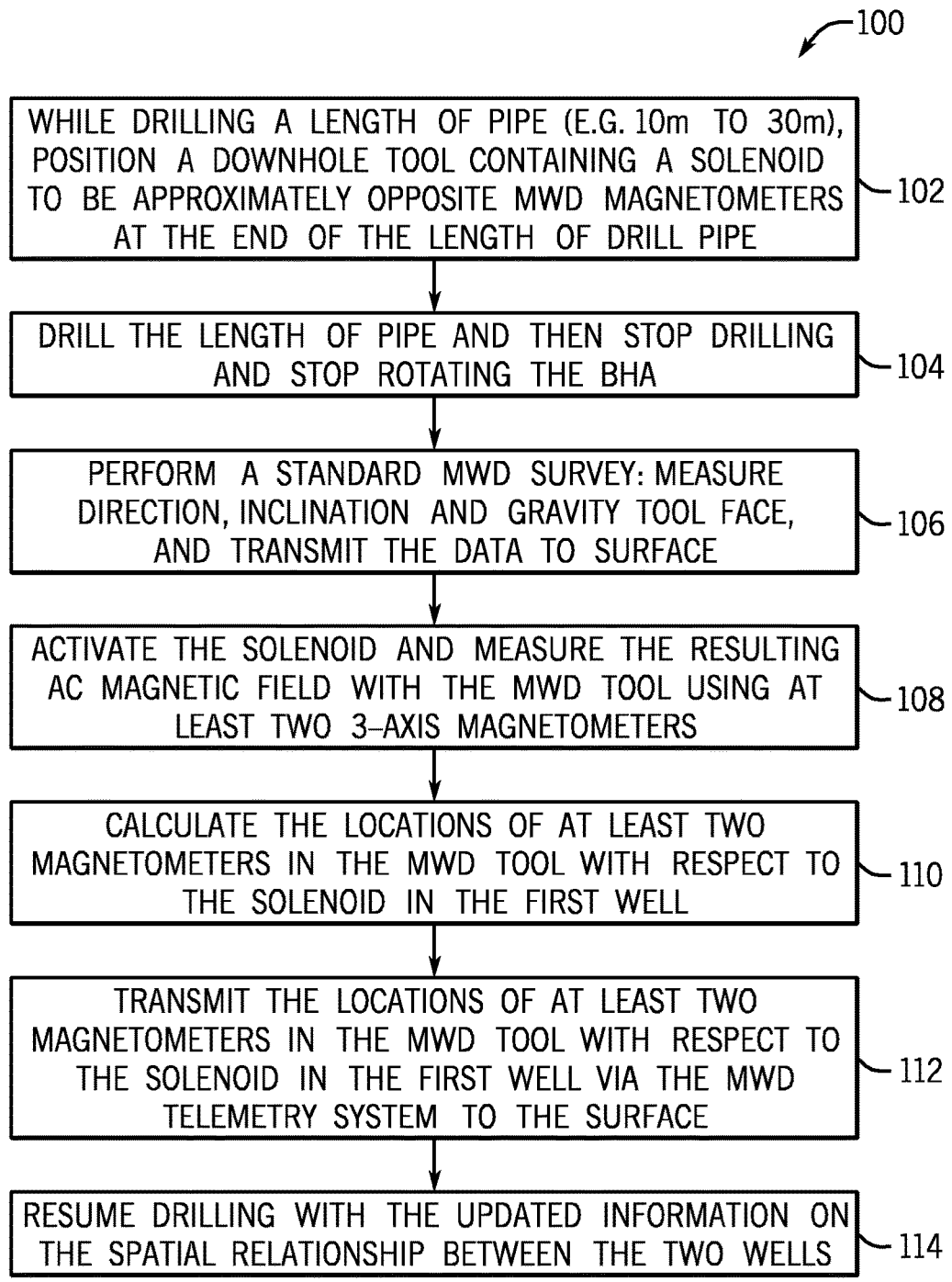
FIG. 3 includes a process flow diagram for a typical magnetic ranging sequence or method in accordance with exemplary embodiments.

FIG. 3 includes a process flow diagram for a typical magnetic ranging sequence or method in accordance with exemplary embodiments. The method is generally indicated by reference numeral 100 and includes various steps or acts represented by blocks in the flow diagram. It should be noted that the method 100 may include various other and/or different procedures in accordance with exemplary embodiments, and that the illustrated embodiment is merely representative. Indeed, in some exemplary embodiments, certain steps or acts in the illustrated embodiment may be excluded and/or performed in a different order.

As illustrated by block 102, the method 100 may begin with drilling a length of pipe (e.g., a stand of pipe from 10 m to 30 m long) with a BHA while moving a downhole tool so that the downhole tool, which includes a solenoid, will be approximately opposite a plurality of MWD tool magnetometers (e.g., 3-axis magnetometers) of the BHA when the length of drill pipe has been drilled. By positioning the downhole tool in this manner, exemplary embodiments may efficiently utilize rig time. It should be noted that the downhole tool may be placed in an approximate position. In other words, it is not necessary to exactly position the downhole tool at a specific location.

As represented by block 104, once the length of pipe has been drilled, the drilling may be stopped, and, thus, rotation of the BHA may be halted. With the drilling and BHA rotation stopped, a standard MWD survey may be performed to obtain direction, inclination, and gravity tool face, as represented by block 106. Further, as represented by block 106, this data can be transmitted to the surface via MWD telemetry, e.g. by mud pulse or electromagnetic telemetry. Next, as illustrated in block 108, a solenoid in the downhole tool may be activated. For example, the solenoid may be activated by an AC current in the range of 1 to 20 Hz. The resulting AC magnetic field may then be measured by at least two magnetometers in the BHA and associated measurement values may be stored in a memory, as illustrated in block 108. As illustrated in block 110, the locations of the two magnetometers in the MWD tool with respect to the solenoid may then be calculated based on the measurements of the magnetic field by each of the two magnetometers. This computation may be performed downhole and then the location values may be transmitted to the surface, as illustrated by block 112. Such a downhole calculation may more efficiently utilize rig time. Accordingly, reinitiating drilling with the updated information on the spatial relationship between the two wells, as illustrated by block 114, can be done more quickly. Indeed, the time required to transmit the two location values would be much less than transmitting raw data from the magnetometers to the surface, and then performing the processing the data at the surface.

Figure 4:
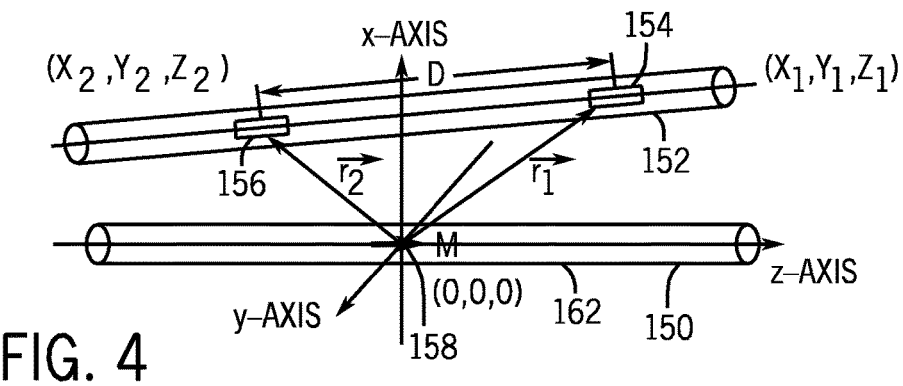
FIG. 4 illustrates a first well and a second well, wherein a pair of magnetometers are positioned a distance D away from one another within the second well and a magnetic dipole is located in the first well in accordance with exemplary embodiments.

FIG. 4 illustrates a first well 150 and a second well 152, wherein a first magnetometer 154 and a second magnetometer 156 are positioned a distance D away from one another within the second well 152, and a magnetic field source or a magnetic dipole 158 is located in the first well 150 in accordance with present embodiments. Each of the magnetometers 154, 156 may be in fixed positions along a downhole tool (e.g., a BHA) that is being used to drill the second well 152, and the magnetic dipole 158 may include a solenoid in a downhole tool disposed within the first well 150.

As indicated above, present embodiments are directed to determining a position of a well being drilled with respect to an existing well. For example, present embodiments may be utilized to determine a relative position of the second well 152 with respect to the first well 150. Referring to FIG. 4, the magnetic dipole 158 (e.g., a solenoid) is located along the borehole axis of the first well 150 at the origin, i.e. at $(x,y,z)=(0,0,0)$. For illustrative purposes, the magnetic dipole 158 may be represented mathematically as a point magnetic dipole that is aligned with the borehole direction. That is, $\vec{M}=M\hat{z}$, where $\hat{z}$ is the unit vector pointing along the axis of the first well. The presence of a steel casing or steel liner, such as a casing 162, may perturb the shape of the magnetic field produced by the magnetic dipole 158, but this can be taken into account with a slight refinement of the model. The primary effect of the casing 162 may be to attenuate the strength of the magnetic field.

The first magnetometer 154 in the second borehole is located at $\vec{r_1}=(x_1,y_1,z_1)$ and the second magnetometer 156 is located at $\vec{r_2}=(x_2,y_2,z_2)$. The locations of these two magnetometers are unknown quantities with respect to the magnetic dipole 158 located at (0, 0, 0). Exemplary embodiments may be utilized to determine these two locations using magnetic field measurements obtained with the two magnetometers 154, 156. Once these two points have been determined, they define the axis of the second well 152 with respect to the first well 150. The known separation between these two magnetometers 154, 156 is $D=\sqrt{(x_1-x_2)^2+(y_1-y_2)^2+(z_1-z_2)^2}$. The distance D between the two magnetometers 154, 156 may be set depending on the desired inter-well spacing. For example, if the inter-well spacing is 5 m, then the two magnetometers 154, 156 should be spaced in the range of 5 m to 10 m. If the inter-well spacing is greater, a spacing of a greater distance may be desirable. The spacing of the magnetometers 154, 156 can be adjusted if they are in separate subs by inserting spacers or downhole MWD or LWD tools between them. In some embodiments, a tool including both of the magnetometers 154, 156 may be configured to facilitate lengthening and shortening the distance between the magnetometers 154, 156, and then fixing them in place in the adjusted location for operation in a particular downhole environment.

Figure 5:
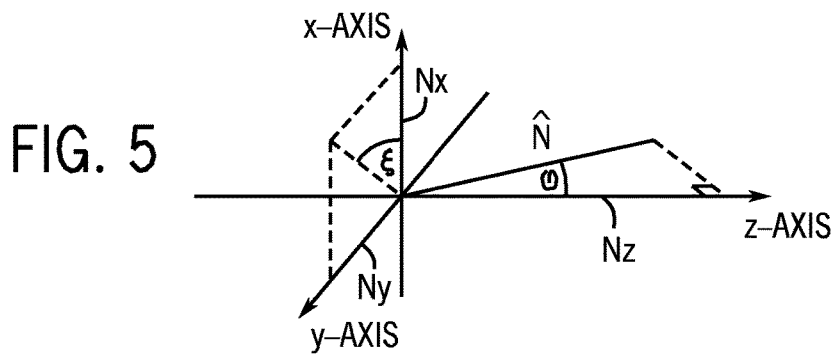
FIG. 5 includes a representative diagram of the first well and the second well of FIG. 4 in accordance with exemplary embodiments.

The direction and inclination of the second well 152 may be known to a certain accuracy since those parameters are measured in a standard MWD survey that provides direction, inclination, and gravity tool face. Similarly, it may be assumed that the first well 150 was surveyed while being drilled or afterwards, so that the direction and inclination of the first well 150 is also known to a certain accuracy. However, the accuracy may not be sufficient to maintain the precise spacing required between the two wells based on these measurements alone. The direction and inclination of the first well 150 can be stored in the memory of the MWD tool prior to its trip into the borehole, or can be transmitted from the surface to the MWD tool while it is downhole. As illustrated in FIG. 5, which includes a representative diagram of the first well 150 and the second well 152, the direction of the second well 152 with respect to the first well 150 is represented by the unit vector $\hat{N}$. The angle between $\hat{N}$ and the z-axis is $\varphi$, and the angle between the projection of $\hat{N}$ into the x-y plane and the x-axis is $\xi$. The unit vector $\hat{N}$ can be written as $\hat{N}=N_x\hat{x}+N_y\hat{y}+N_z\hat{z}$, where $N_x=\cos\xi \sin\varphi$, $N_y=\sin\xi \sin\varphi$, and $N_z=\cos\varphi$. From, $\vec{r_1}=\vec{r_2}+D\hat{N}$, one obtains: $x_1=x_2+D\cos\xi \sin\varphi$, $y_1=y_2+D\sin\xi \sin\varphi$, and $z_1=z_2+D\cos\varphi$.

Taking into consideration a situation where the magnetic dipole $\vec{M}$ is activated, in general, the magnetic field at $\vec{r_1}$ and $\vec{r_2}$ will have field components along the three directions, $\hat{x}$, $\hat{y}$, $\hat{z}$, namely $\vec{B}(\vec{r_1})=B_x(\vec{r_1})\hat{x}+B_y(\vec{r_1})\hat{y}+B_z(\vec{r_1})\hat{z}$, and $\vec{B}(\vec{r_2})=B_x(\vec{r_2})\hat{x}+B_y(\vec{r_2})\hat{y}+B_z(\vec{r_2})\hat{z}$. All six magnetic field components can be measured by the two magnetometers 154, 156, which may include 3-axis MWD magnetometers. The magnetometer axes may not coincide with x, y, and z directions, but the magnetometer readings may be rotated to the x, y, and z directions based on the survey data for the two wells 150, 152. The well surveys are sufficiently accurate for this purpose. With the direction and inclination stored in the memory of the MWD tool, this can be done downhole.

With $\vec{M}$ activated, the magnetic field components at the first MWD magnetometer are:

$$B_x(x_1, y_1, z_1) = \frac{3\mu_0 M}{4\pi}\left(\frac{x_1 z_1}{r_1^5}\right), \quad \text{(eq. 1)}$$

$$B_y(x_1, y_1, z_1) = \frac{3\mu_0 M}{4\pi}\left(\frac{y_1 z_1}{r_1^5}\right), \text{ and}$$

$$B_z(x_1, y_1, z_1) = \frac{3\mu_0 M}{4\pi}\left(\frac{z_1^2 - r_1^2/3}{r_1^5}\right), \text{ where}$$

$$r_1 = |\vec{r_1}| = \sqrt{x_1^2 + y_1^2 + z_1^2}.$$

Figure 6:
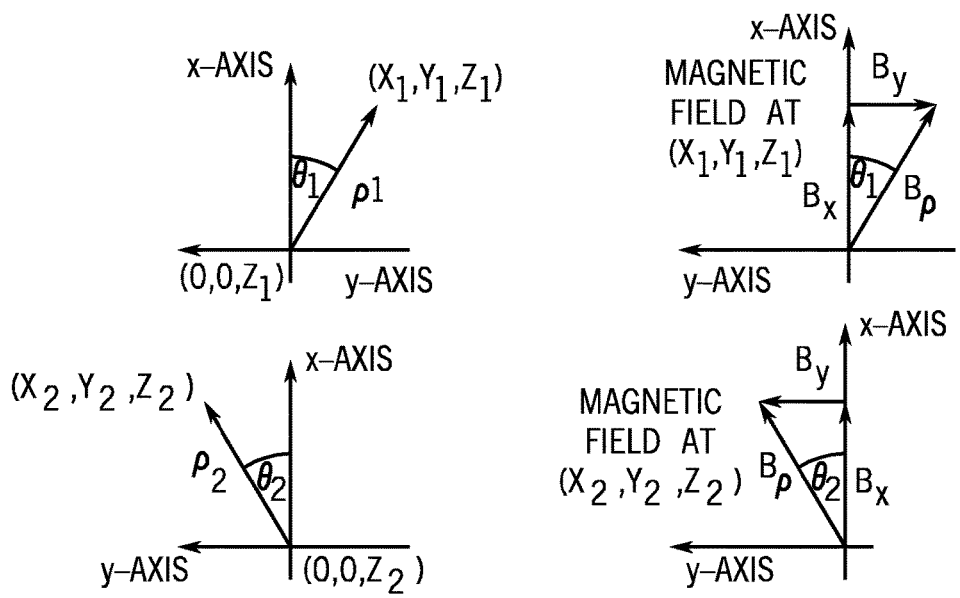
FIG. 6 includes representative diagrams of geometries for measured magnetic field components in accordance with exemplary embodiments.

FIG. 6 includes representative diagrams of geometries for the magnetic field components measured at $\vec{r_1}=(x_1,y_1,z_1)$ and at $\vec{r_2}=(x_2, y_2, z_2)$ in accordance with present embodiments. In the embodiment shown in FIG. 6, the magnetic field at $\vec{r}_1$ lies in a plane defined by $\hat{z}$ and the radial vector defined by $\vec{\rho}_1 = x_1\hat{x} + y_1\hat{y}$. Hence, the magnetic field has components only in the z direction and in the radial direction defined by $\vec{\rho}_1$. The magnetic field component in the radial direction is $\vec{B}\rho(\vec{r}_1) = B_\rho(\vec{r}_1)\hat{\rho}_1 = B_x(\vec{r}_1)\hat{x} + B_y(\vec{r}_1)\hat{y}$, where $\hat{\rho}_1 = \vec{\rho}_1/|\vec{\rho}_1|$ is a unit vector. The direction of $\vec{B}_\rho(\vec{r}_1)$ in the x-y plane is given by tan $$\theta_1 = \frac{B_y(\vec{r}_1)}{B_x(\vec{r}_1)}.$$

Hence, the ratio of these two measured magnetic field components determine the direction from the first magnetometer 154 to a point on the axis of the first well 150 at $(0,0,z_1)$. Since $\tan\theta_1$ has now been determined, one unknown quantity can be eliminated because $y_1 = x_1 \tan\theta_1$. Note that $B_\rho \to 0$ as $z_1 \to 0$, hence $B_x(\vec{r}_1) \to 0$ and $B_y(\vec{r}_1) \to 0$. This means that it may be difficult to determine the angle $\theta_1$ when the first magnetometer 154 is directly across from the magnetic dipole 158.

The magnetic field at the second magnetometer 156 may be given by the following equation:

$$B_x(x_2, y_2, z_2) = \frac{3\mu_0 M}{4\pi}\left(\frac{x_2 z_2}{r_2^5}\right), \quad \text{(eq. 2)}$$

$$B_y(x_2, y_2, z_2) = \frac{3\mu_0 M}{4\pi}\left(\frac{y_2 z_2}{r_2^5}\right), \text{ and}$$

$$B_z(x_2, y_2, z_2) = \frac{3\mu_0 M}{4\pi}\left(\frac{z_2^2 - r_2^2/3}{r_2^5}\right), \text{ where}$$

$$r_2 = |\vec{r}_2| = \sqrt{x_2^2 + y_2^2 + z_2^2}.$$

The magnetic field at $\vec{r}_2$ lies in a plane defined by $\hat{z}$ and a radial vector given by $\vec{\rho}_2 = x_2\hat{x} + y_2\hat{y}$. The magnetic field in the radial direction may be represented as $\vec{B}\rho(\vec{r}_2) = B_\rho(\vec{r}_2)\hat{\rho}_2 = B_x(\vec{r}_2)\hat{x} + B_y(\vec{r}_2)\hat{y}$, where $\hat{\rho}_2 = \vec{\rho}_2/|\vec{\rho}_2|$ is a unit vector. The direction from the second magnetometer 156 at $(x_2, y_2, z_2)$ to a point on the axis of the first well 150 at $(0,0,z_2)$ may be obtained from tan $$\theta_2 = \frac{B_y(\vec{r}_2)}{B_x(\vec{r}_2)}.$$

These measurements can eliminate another unknown quantity with $y_2 = x_2 \tan\theta_2$. It should be noted that $\theta_2$ is not necessarily the same angle as $\theta_1$, i.e. the two wells may not lie in a plane.

Define the quantities $$u \equiv \frac{z_1}{\rho_1} = \frac{z_1}{\sqrt{x_1^2 + y_1^2}} \text{ and } \alpha \equiv \frac{B_z(\vec{r}_1)}{B_\rho(\vec{r}_1)} = \frac{2u^2 - 1}{3u},$$

where $\alpha$ is known from the measured magnetic field components at the first magnetometer. Solving the corresponding quadratic equation yields $$u = \frac{3\alpha \pm \sqrt{9\alpha^2 + 8}}{4}.$$

For approximately parallel wells, the + sign is used if $z_1 > 0$ and the − sign is used if $z_1 < 0$.

Similarly, define the quantities $$v \equiv \frac{z_2}{\rho_2} = \frac{z_2}{\sqrt{x_2^2 + y_2^2}} \text{ and } \beta \equiv \frac{B_z(\vec{r}_2)}{B_\rho(\vec{r}_2)} = \frac{2v^2 - 1}{3v},$$

where $\beta$ is known from the measured magnetic field components at the second magnetometer. Solving the corresponding quadratic equation yields $$v = \frac{3\beta \pm \sqrt{9\beta^2 + 8}}{4}.$$

For approximately parallel wells, the + sign is used if $z_2 > 0$ and the − sign is used if $z_2 < 0$.

It has now been determined that $z_1 = u\, x_1\sqrt{1+\tan^2\theta_1}$ where $u$ and $\tan\theta_1$ are known quantities; and $z_2 = v\, x_2\sqrt{1+\tan^2\theta_2}$ where $v$ and $\tan\theta_2$ are known quantities. The equation $z_1 - z_2 = D\cos\varphi = u\, x_1\sqrt{1+\tan^2\theta_1} - v\, x_2\sqrt{1+\tan^2\theta_2}$ can be rewritten as $$x_2 = \frac{u\, x_1\sqrt{1+\tan^2\theta_1} - D\cos\varphi}{v\sqrt{1+\tan^2\theta_2}}.$$

Also, it has now been obtained that $$x_2 = \frac{x_1\tan\theta_1 - D\sin\xi\sin\varphi}{\tan\theta_2}$$

from $y_1 - y_2 = D\sin\xi\sin\varphi = x_1\tan\theta_1 - x_2\tan\theta_2$. Equating these two expressions for $x_2$ yields the following equation:

$$x_1 = D\left\{\frac{\cos\varphi\tan\theta_2 - v\sin\xi\sin\varphi\sqrt{1+\tan^2\theta_2}}{u\tan\theta_2\sqrt{1+\tan^2\theta_1} - v\tan\theta_1\sqrt{1+\tan^2\theta_2}}\right\}. \quad \text{(eq. 3)}$$

When $\tan\theta_1 \approx 0$ and $\tan\theta_2 \approx 0$, the above equation may produce a noisy result. Alternatively, in this case one can use $x_2 = x_1 - D\cos\xi\sin\varphi$ to obtain the following result:

$$x_1 = D\left\{\frac{\cos\varphi - v\sin\varphi\cos\xi\sqrt{1+\tan^2\theta_2}}{u\sqrt{1+\tan^2\theta_1} - v\sqrt{1+\tan^2\theta_2}}\right\}. \quad \text{(eq. 4)}$$

It should be noted that there are four possible solutions since there are two roots for the two quadratic equations. However, three of the possible solutions can be easily eliminated due to the unrealistic values they produce. The remaining unknown quantities are now found from the following equation:

$$y_1 = x_1 \tan\theta_1, z_1 = u\, x_1\sqrt{1+\tan^2\theta_1}, x_2 = x_1 - D\cos\xi\sin\varphi, y_2 = x_2\tan\theta_2, \text{ and } z_2 = v\, x_2 + \sqrt{1+\tan^2\theta_2}. \quad \text{(eq. 5)}$$

Hence, the location of the first magnetometer 154, $\vec{r}_1=(x_1,y_1,z_1)$, and the location of the second magnetometer 156, $\vec{r}_2=(x_2,y_2,z_2)$, may be fully determined from the magnetic field measurements and the known directions and inclinations of the two wells 150, 152. These two points define a line which is the axis of the second well 152. It should be noted that it was not necessary to know the measured depths of the magnetometers 154, 156 in the second well 152 or the measured depth of the magnetic dipole 158 (e.g., a solenoid) in the first well 150.

While the embodiments discussed above include a pair of magnetometers, which may be components of a downhole tool. It should be noted that in accordance with some embodiments, an downhole tool, such as an MWD tool, could contain three (or more) magnetometers spaced along its length. Further, it should be noted that the processing described above could be performed with any pair of magnetometers along a series of magnetometers to determine a relative position of the second well 152 with respect to the first well 150.

Figure 7:
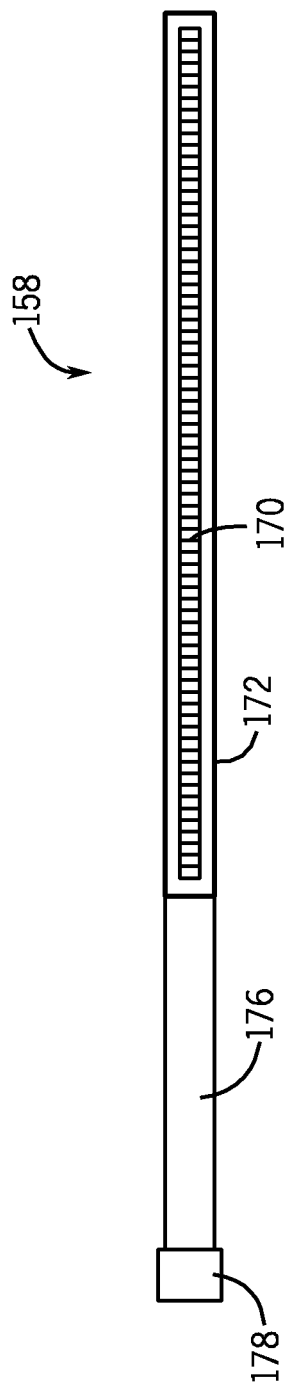
FIG. 7 includes a view of a solenoid in accordance with exemplary embodiments.

As indicated above, the magnetic dipole 158 deployed in the first well 150 (e.g., the producer well) may include a solenoid. Referring to FIG. 7, the solenoid 158 may be constructed with a magnetic core (e.g. mu-metal) 170. Typical dimensions for the core might be an outer diameter of approximately 7 cm, and a core length between approximately 2 m and approximately 4 m. Several thousand turns of solid magnetic wire (e.g. #28 gauge magnet wire) may be wrapped over the core and the entire assembly may be enclosed in a fiberglass housing 172. If the downhole tool that contains the solenoid is to be subjected to high pressures, then the inside of the fiberglass housing may be filled with oil to balance external pressures. If the pressures are less than a few thousand psi, then the housing can be permanently filled with epoxy resin. The outer diameter of the fiberglass housing may be approximately 10 cm in some embodiments. Power supply module 176 provides a DC or alternating electric current to drive the solenoid 158. Connection of the solenoid 158 to other downhole equipment and wireline cable may be achieved via bulkhead 178.

The solenoid's magnetic dipole moment may be given by $M=N\, I\, A_{EF}$ where N is the number of wire turns, I is the current, and $A_{EF}$ is the effective area which includes the amplification provided by the magnetic core. Experiments have demonstrated that such a solenoid can produce a magnetic moment in air or in or an open borehole of several thousand amp-meter$^2$ at modest power levels (tens of watts). In a specific example, it may be assumed that the solenoid 158 has the magnetic moment of 1000 amp-meter$^2$ in air. However, if the casing 162 in the first well 150 is made of magnetic steel, the magnetic dipole moment will be attenuated. For example, experiments show that a 7-inch OD steel casing with 0.41-inch wall thickness will attenuate the magnetic field outside the casing by approximately 17 dB at 10 Hz, resulting in an effective magnetic moment of 140 amp-meter$^2$ inside casing, compared to 1000 amp-meter$^2$ in air. The amount of attenuation depends on the casing properties and on the frequency. Further, the attenuation generally increases rapidly above about 20 Hz. To calculate the signal-noise ratio for a realistic system, it may be assumed that a precision of 0.1 nTesla can be achieved on each magnetometer axis with an AC magnetic field of 20 Hertz or less.

The following is a discussion of an example relating to a pair of substantially parallel SAGD wells, wherein the wells have a distance of approximately 7 m between them. In this first example, which is based on theoretical calculations, two magnetometers in a BHA are separated by a distance of D=10 m, and a solenoid's magnetic dipole moment is 200 amp-meter$^2$, which is appropriate for a steel-cased well. The BHA may be positioned in the injector well, and the solenoid may be positioned in the producer well (the first, existing well). Specifically, the magnetic dipole source is located at (x,y,z)=(0,0,0). The injector well is drilled at approximately 7 m above the producer well with a 1 m offset in the transverse (y) direction. The relative direction of the second well (i.e., the injector well) with respect to the first well (i.e., the producer well) may be given by $\varphi=2°$ and $\xi=0°$.

In this first example, the starting position for the first magnetometer is $(x_1,y_1,z_1)=(7.00,1.00,-5.00)$, where distances are in meters unless otherwise notated. Because the second well is canted at an angle of 2°, the initial location of the second magnetometer is $(x_2,y_2,z_2)=(6.65,1.00,-14.99)$. In the following calculation, the MWD BHA is moved in the positive direction in 0.25 m steps. The abscissa in the following plots indicates the position of the first magnetometer along the borehole of the injector. Since the injector is not parallel to the producer the position on the abscissa is not exactly the same as the z-position, but the differences are slight enough to ignore. For each 0.25 m step, the magnetic field components are calculated from the previously given equations (1) and (2). Then random noise with a standard deviation of 0.1 nTesla is added to all magnetic field components. Finally, equations (3), (4), and (5) are used to determine the locations of the two magnetometers.

Figure 8:
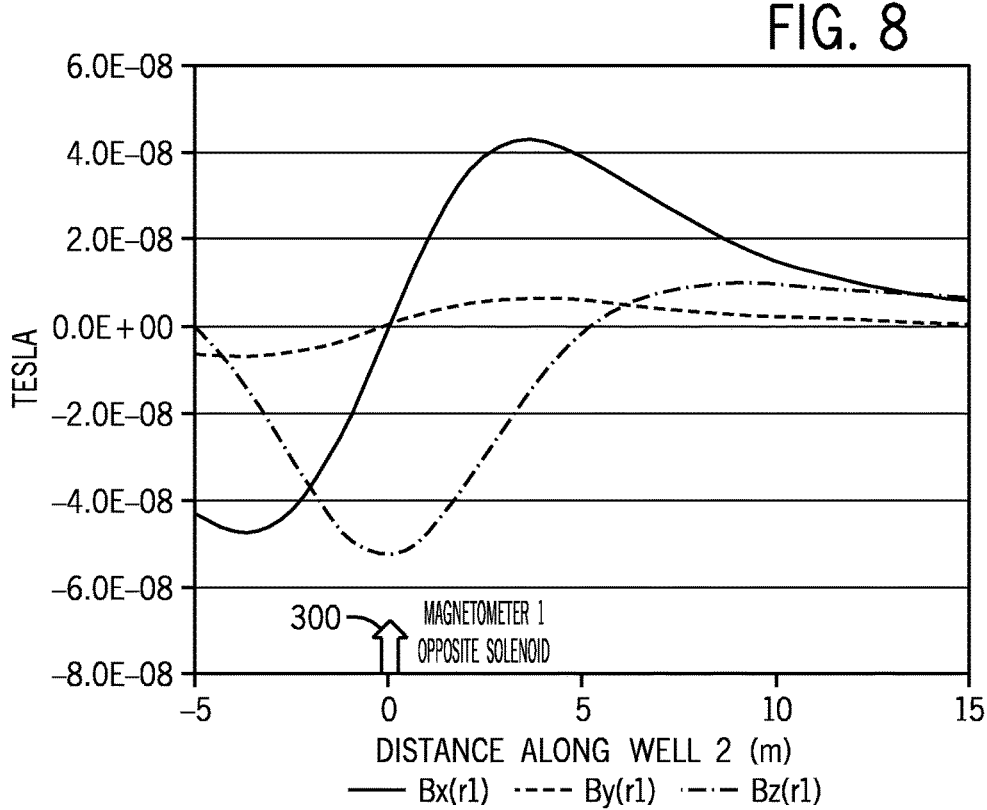
FIGS. 8 and 9 include graphs of magnetic field measurements versus distance along a well for magnetic field components measured at each of a pair of magnetometers, respectively, in accordance with exemplary embodiments.

FIG. 8 is a graph of the magnetic field strength in Tesla versus distance along the second well for magnetic field components measured at the first magnetometer in accordance with present embodiments. Specifically, the graph of FIG. 8 contains the calculated magnetic field components $B_x(\vec{r}_1)$, $B_y(\vec{r}_1)$, and $B_z(\vec{r}_1)$ with random noise added. An arrow 300 in FIG. 8 indicates when the first magnetometer is opposite the solenoid. It should be noted that the maximum amplitude of $|B_z(\vec{r}_1)|$ occurs when the first magnetometer is opposite the solenoid. At this position, the other two field components, $B_x(\vec{r}_1)$ and $B_y(\vec{r}_1)$, pass through zero.

Figure 9:
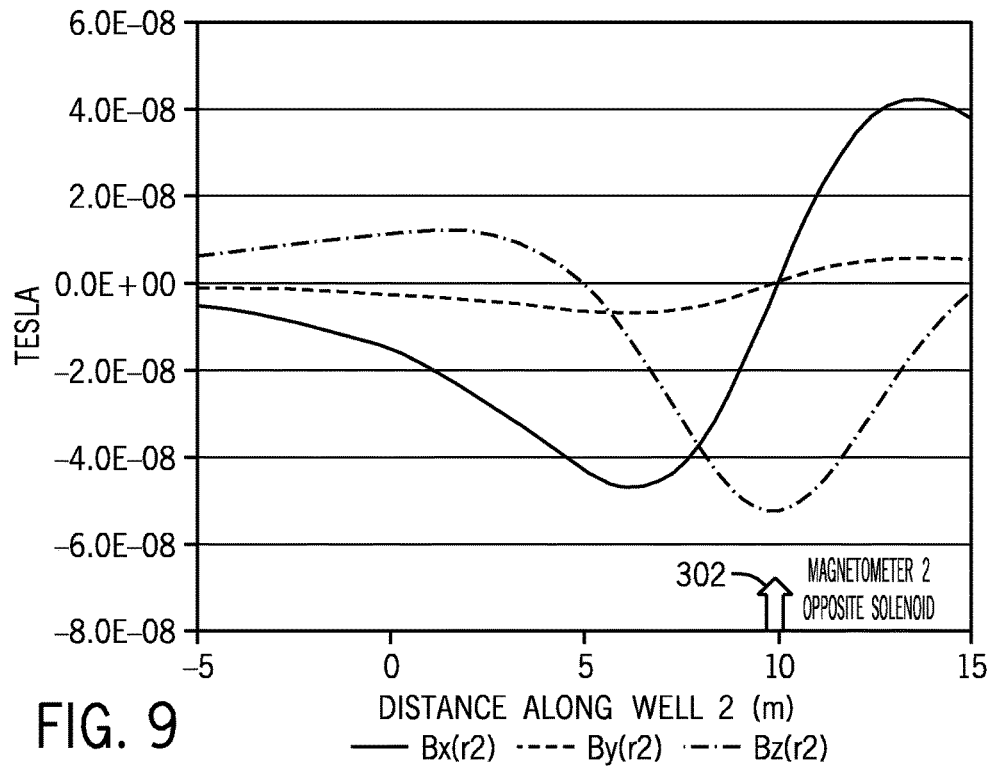

FIG. 9 is a graph of the magnetic field strength in Tesla versus distance along the second well for magnetic field components measured at the second magnetometer in accordance with exemplary embodiments. Specifically, the graph of FIG. 9 contains the magnetic field components $B_x(\vec{r}_2)$, $B_y(\vec{r}_2)$, and $B_z(\vec{r}_2)$ as measured at the second magnetometer. Note that the magnetic field strength seen by both magnetometers is greatest between 0 m and 5 m, which corresponds to the solenoid being located between the two magnetometers. This results in the higher accuracy when the solenoid is located outside this interval. An arrow 302 in FIG. 9 indicates when the second magnetometer is opposite the solenoid.

Figure 10:
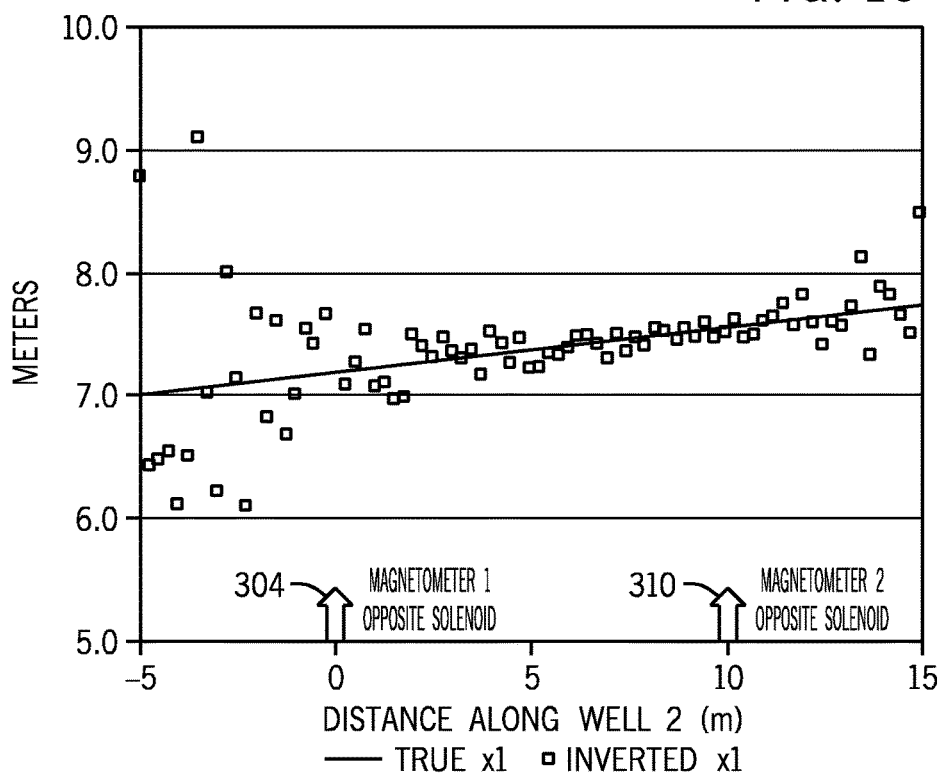
Figure 11:
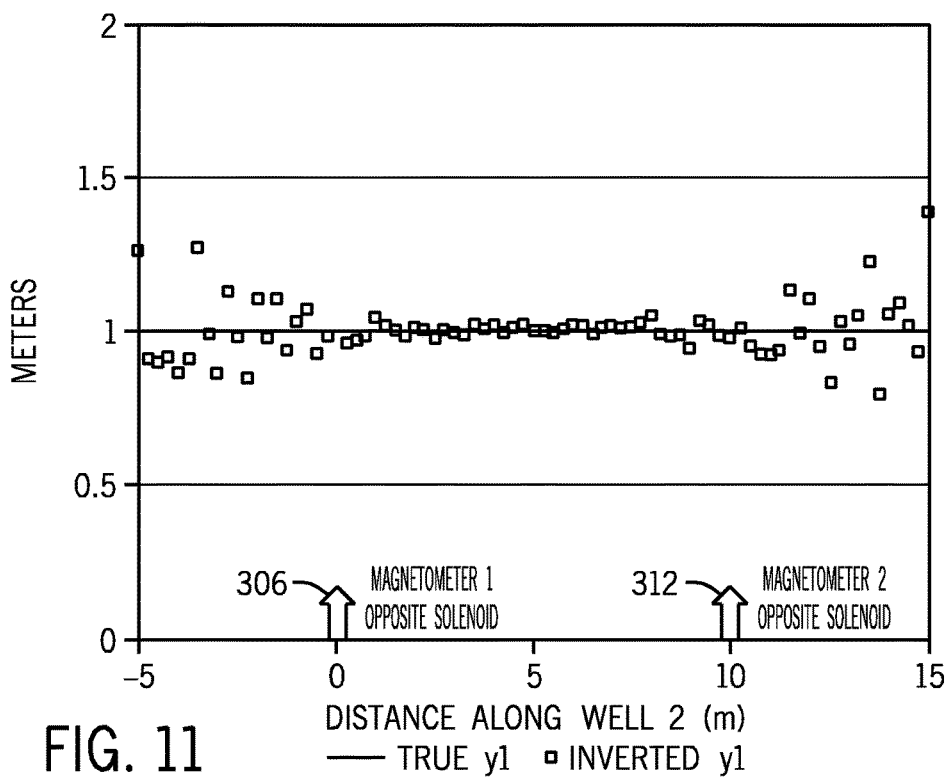

FIGS. 10, 11, and 12 include graphs of the true positions $(x_1,y_1,z_1)$ of the first magnetometer and the positions obtained with equations (3), (4), and (5) based on the first example in accordance with one embodiment. FIGS. 10, 11, and 12 also each include arrows that indicate when the first and second magnetometers are opposite the solenoid. Specifically, FIGS. 10, 11, and 12 include an arrow 304, an arrow 306, and an arrow 308, respectively, which each indicate when the first magnetometer is opposite the solenoid. Similarly, FIGS. 10, 11, and 12 include an arrow 310, an arrow 312, and an arrow 314, respectively, which each indicate when the second magnetometer is opposite the solenoid. The differences between the true and inverted positions are due to the random noise that was added to the calculated magnetic fields. Table 1, as set forth below, relates to the first example and displays the differences between the true and inverted positions when the solenoid is between the two magnetometers, i.e. for the region between 0 m and 5 m in the plots. The standard deviations of the differences are also listed in Table 1.

TABLE 1

|  | $\Delta x_1$ | $\Delta y_1$ | $\Delta z_1$ |
| --- | --- | --- | --- |
| Average | −0.7 cm | 0.1 cm | −0.2 cm |
| Standard Deviation | 12.6 cm | 2.0 cm | 5.8 cm |

Similarly precise results may be obtained for the position of the second magnetometer. The position of the second magnetometer may be obtained from the known separation D and the known angles φ and ξ.

A second example may relate to non-parallel SAGD wells. In the second example, the two wells are not parallel, but have relative direction given by φ=−15° and ξ=45°. As before, D=10 m, the magnetic dipole moment is 200 amp-Meter², and the random noise is 0.1 nTesla. The starting position for the first magnetometer is $(x_1,y_1,z_1)=(12.00, 0.00,-5.00)$, and the starting position for the second magnetometer is $(x_2,y_2,z_2)=(13.83,1.83,-14.66)$. The magnetometers are moved along the second borehole and calculations performed at 0.25 m intervals.

Figure 14:
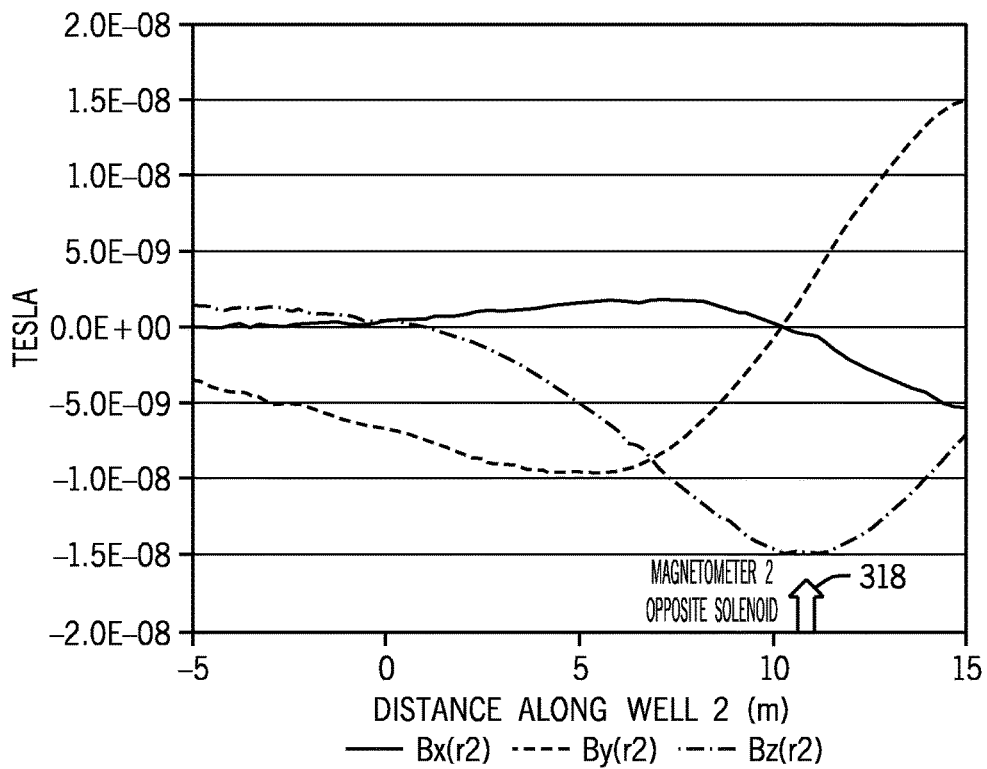

FIGS. 13 and 14 include graphs of the magnetic field strength in Tesla versus distance along the second well for magnetic field components measured at the first magnetometer and second magnetometers, respectively, in accordance with exemplary embodiments. Specifically, FIGS. 13 and 14 show the magnetic field components: $B_x(\vec{r_1})$, $B_y(\vec{r_1})$, $B_z(\vec{r_1})$, $B_x(\vec{r_2})$, $B_y(\vec{r_2})$, and $B_z(\vec{r_2})$. FIGS. 13 and 14 also include arrows that indicate when the first and second magnetometers, respectively, are opposite the solenoid. Specifically, FIG. 13 includes an arrow 316 that indicates when the first magnetometer is opposite the solenoid, and FIG. 14 includes an arrow 318 that indicates when the second magnetometer is opposite the solenoid.

Figure 15:
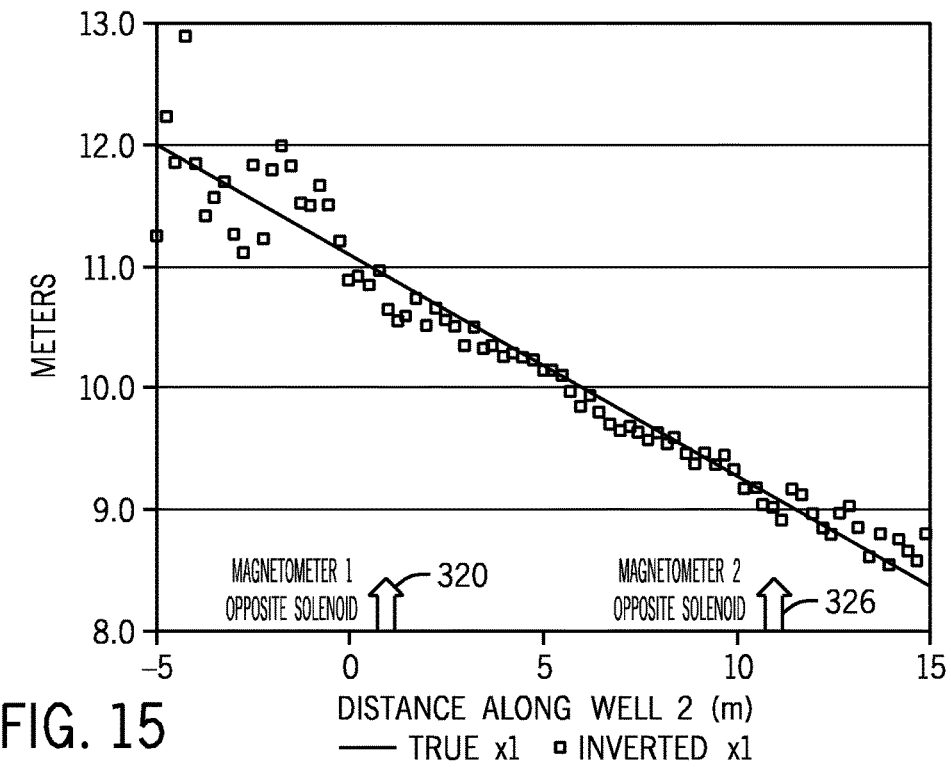
FIGS. 15, 16, and 17 show the true positions and the inverted positions of the first magnetometer as the BHA moves along the wellbore in accordance with exemplary embodiments.
Figure 16:
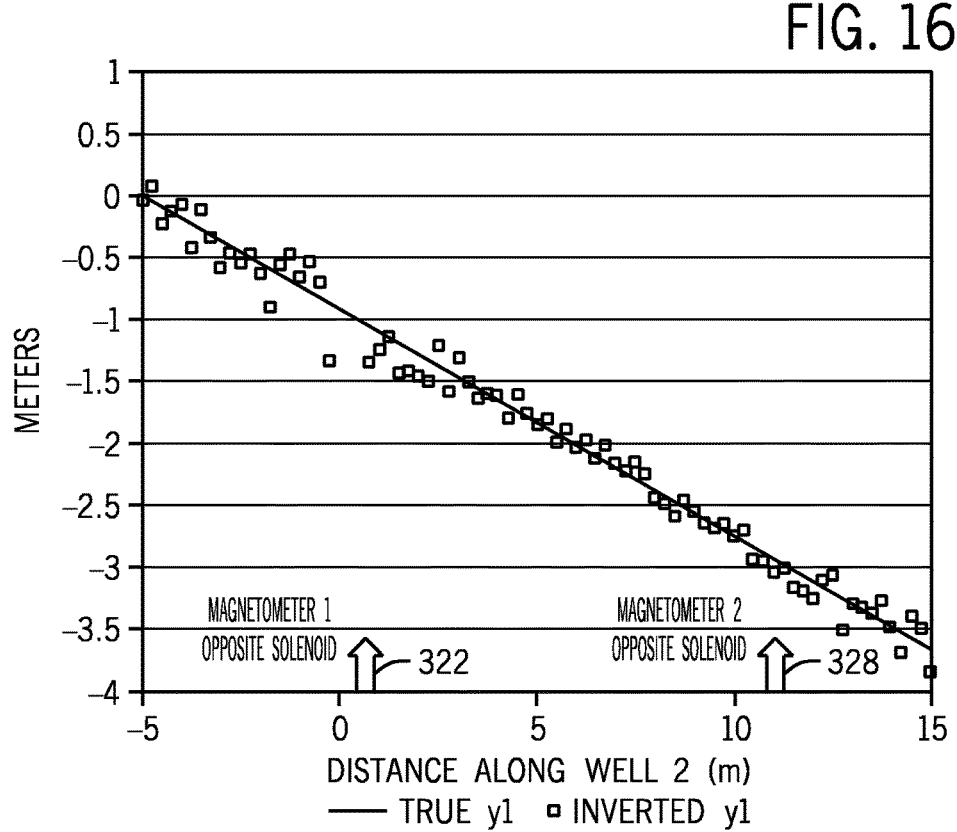
Figure 17:
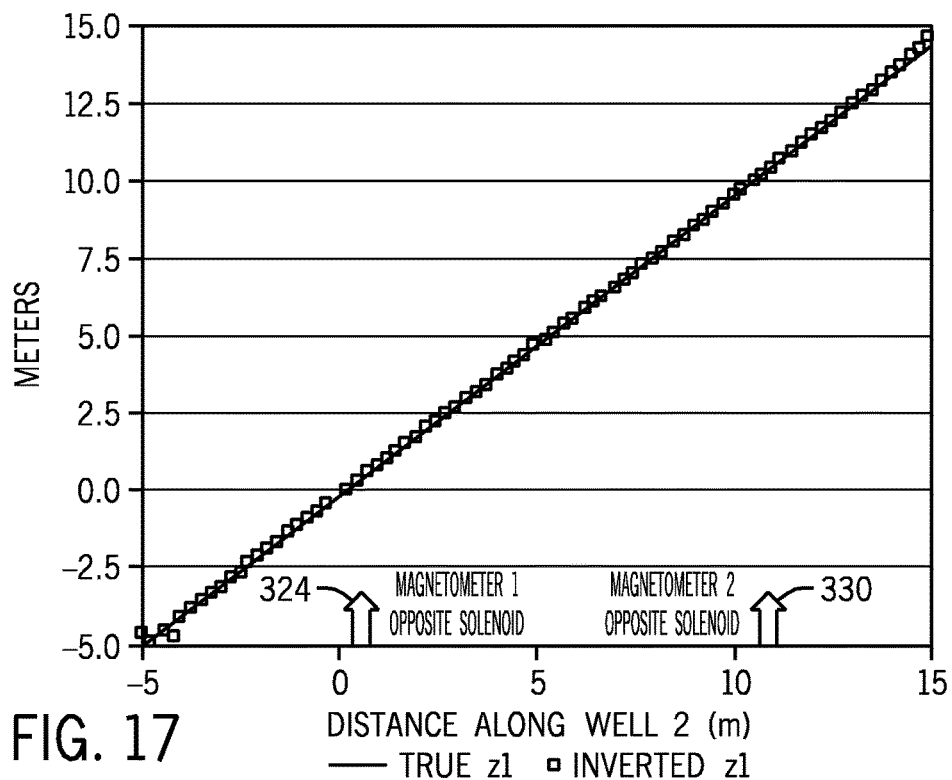

FIGS. 15, 16, and 17 show the true positions $(x_1,y_1,z_1)$ and the inverted positions of the first magnetometer as the BHA moves along the wellbore in accordance with present embodiments. Further, FIGS. 15, 16, and 17 also each include arrows that indicate when the first and second magnetometers are opposite the solenoid. Specifically, FIGS. 15, 16, and 17 include an arrow 320, an arrow 322, and an arrow 324, respectively, which each indicate when the first magnetometer is opposite the solenoid. Similarly, FIGS. 15, 16, and 17 include an arrow 326, an arrow 328, and an arrow 330, respectively, which each indicate when the second magnetometer is opposite the solenoid.

Table 2, as set forth below, displays the differences between the true and inverted positions when the solenoid is between the two magnetometers, i.e. for the region between 0 m and 5 m in the plots. The standard deviations for the data from the second example are also listed in Table 2 below.

TABLE 2

|  | $\Delta x_1$ | $\Delta y_1$ | $\Delta z_1$ |
| --- | --- | --- | --- |
| Average | 7.8 cm | 2.1 cm | 2.4 cm |
| Standard Deviation | 9.0 cm | 11.3 cm | 2.3 cm |

As indicated above, exemplary embodiments may include a magnetic field sensor system that includes two or more magnetometers that are aligned and spaced a certain distance apart from adjacent magnetometers. A magnetic field source may be placed in a first well, such as in a drilling tool, and the magnetic field sensor system including two or more magnetometers may be placed in a second well. For example, an array of 3-axis magnetometers may be deployed in the second well and connected to the surface by a wireline cable or the like. The magnetometers within the array may be arranged such that there is a known distance between each adjacent magnetometer in the array. As in the exemplary embodiments set forth above, each of the magnetometers may individually be capable of measuring the magnetic field produced by the magnetic field source.

Accordingly, magnetic field measurements from adjacent pairs of magnetometers may be used to calculate a relative location of the magnetic field source. In view of this, it may not be necessary to know the exact location of the measurement point along the axis of the first well or the exact location of the magnetometers in the second well. Further, by using an array of magnetometers, it is not necessary to move the magnetic field sensor system for each survey point. Furthermore, exemplary embodiments may provide automated steering of a BHA using data acquired from an adjacent well. In other words, all or a portion of steering a BHA may be achieved without human intervention using systems and methods in accordance with exemplary embodiments.

Figure 18:
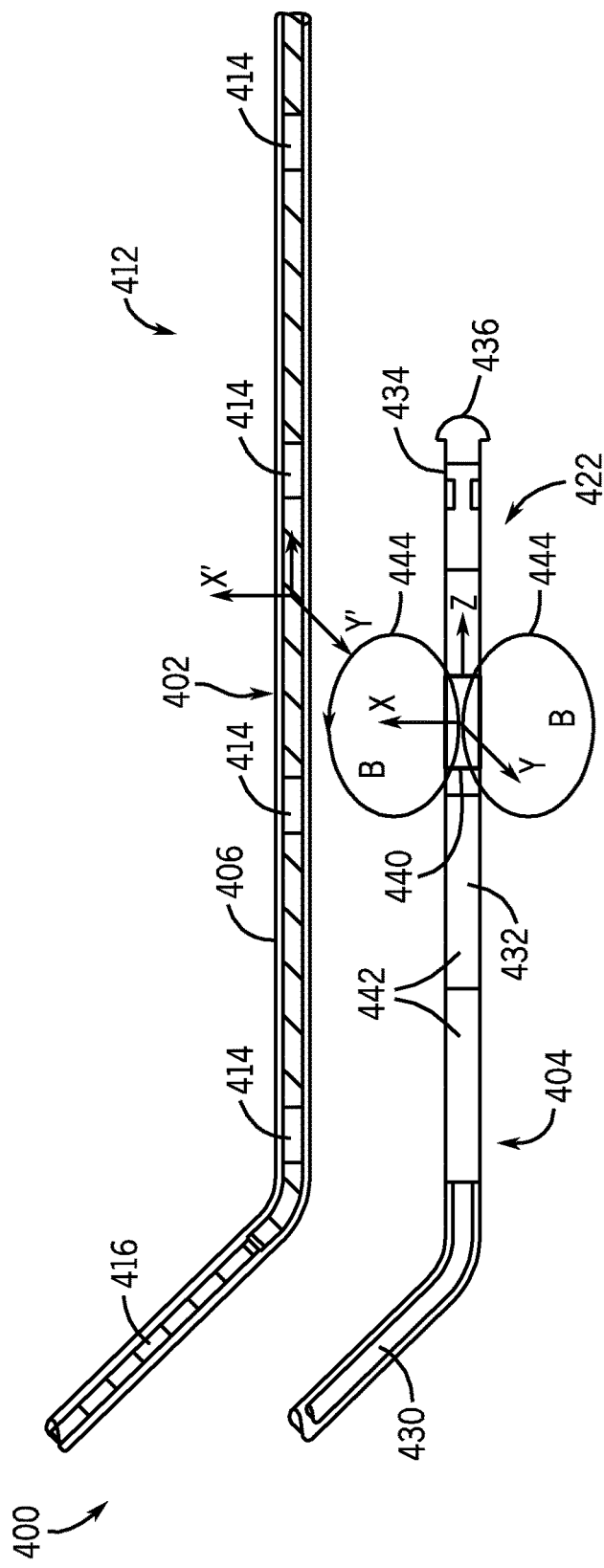
FIG. 18 illustrates a well drilling operation utilizing an array of magnetometers for dual magnetic sensor ranging while drilling in accordance with exemplary embodiments.

FIG. 18 illustrates a well drilling operation 400 including an existing first well 402 and a second well 404 in the process of being drilled, wherein the drilling operation 400 is utilizing an array of magnetometers for multiple magnetic sensor ranging while drilling in accordance with one embodiment. Specifically, FIG. 18 illustrates one embodiment wherein the first well 402 has been drilled and completed with a liner or casing 406 (e.g., a slotted liner), and an array 412 of magnetometer systems 414 have been inserted into the first well 402. It should be noted that, to facilitate accurate measurement and to increase the inter-well distance, non-magnetic liner or casing may be used in completed wells (e.g., the first well 402). The array 412 in the illustrated embodiment is coupled with tubing 416 containing a wireline cable, which supplies power and transmits data to the surface. The tubing 416 may also be used to insert the array 412 into a horizontal well. The magnetometer systems 414 may typically be spaced equal distances apart (e.g., 10 to 30 m apart) depending on the desired distance between the first and second wells 402, 404, and the ranging accuracy desired. In some exemplary embodiments, spacing between the 3-axis magnetometer systems 414 may differ from one set of adjacent magnetometer systems to the next set.

Figure 19:
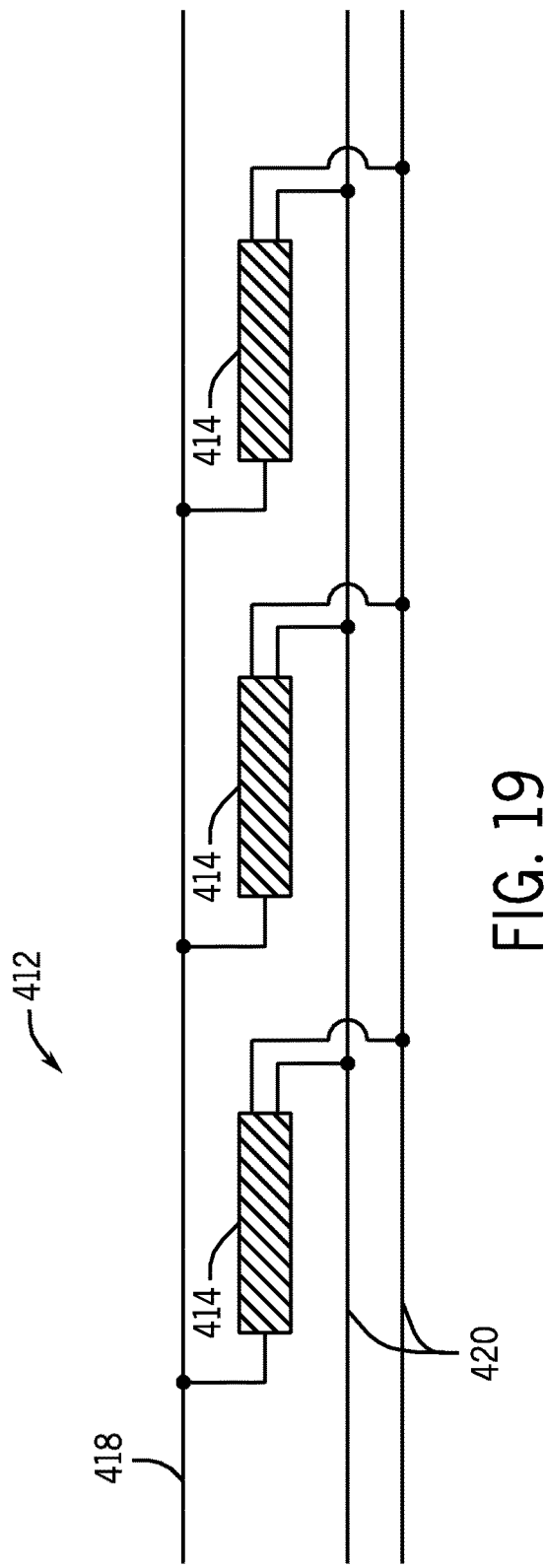
FIG. 19 is a schematic view of a section of an array of magnetometer systems in accordance with exemplary embodiments.

FIG. 19 is a schematic view of a section of the array 412 in accordance with an exemplary embodiment of the present invention. Specifically, the array 412 includes a plurality of magnetometer systems 414 that are communicatively coupled with a data bus 418 and a power line 420. The data bus 418 and the power line 420 may be communicatively coupled to the wireline cable in tubing 416, which may provide power to the array 412 and communicate data to equipment at the surface. In one embodiment, the array 412 may be coupled to non-magnetic tubular spacers. For example, the tubular spacers may be made of aluminum, stainless steel, or composite materials. The tubular spacers and magnetometer systems 414 may be deployed into a wellbore on coil tubing 416, and the array may be recovered from the first well 402 after the second well 404 has been drilled.

Each magnetometer system 414 may include a magnetometer (e.g., a 3-axis magnetometer), an inclinometer (e.g., a 3-axis inclinometer), an analog-to-digital converter, a processing unit capable of acquiring and processing data, and a telemetry module. The inclinometer in each of the magnetometer systems 414 may be used to determine the inclination of the magnetometer system 414 and to determine the gravity tool face. The gravity tool face may be defined as the orientation of the magnetometer with respect to up—the high side of the hole. Thus, direction, inclination, and gravity tool face for each of the magnetometer systems 414 may be determined via on-board measurements. However, in one embodiment, MWD and/or wireline surveys of the first well 402 may be used to determine the direction and inclination for each magnetometer system 414. Indeed, since the depth of the first well 402 may be known, the prior well survey data may be used to determine the direction and inclination of each magnetometer system 414. Acquiring gravity tool face may require data from two single-axis accelerometers mounted transverse to the axis of the array 412.

Each of the plurality of magnetometer systems 414 may be capable of measuring DC and low frequency AC magnetic fields, and either measurement mode made be capable of activation by a command from the surface. In DC mode, the magnetometer systems 414 may measure the Earth's large static magnetic field, ~50,000 nanoTesla. This may establish a direction of the magnetometer system 414 with respect to north. The AC mode may be used to facilitate magnetic ranging to other wells. Frequencies in the range of sub-Hertz to about 20 Hz may be desirable. In AC mode, a high pass filter on the output of a magnetometer's analog output may block the Earth's DC magnetic field, which facilitates accurate measurement of weaker magnetic fields. The noise floor may be approximately 0.1 nanoTesla for each magnetometer axis with a 10 Hertz magnetic field. In some exemplary embodiments, DC measurements may be used for ranging to other wells. In such cases, the DC magnetic field generated for ranging may be subtracted from the Earth's large magnetic field, which increases accuracy requirements on the magnetometer systems 414.

It should also be noted that, as illustrated in FIG. 18, the well drilling operation 400 includes a BHA 422. The BHA 422 in the illustrated embodiment includes, among other things, drill pipe or coiled tubing 430, an MWD tool 432, a steerable system 434, and a drill bit 436. The use of coiled tubing, such as the coiled tubing 430, may facilitate continuous automated drilling without the need to stop for survey data, adding drill pipe, and so forth. This reduces personnel requirements and improves efficiency. The steerable system 434 may include a rotary steerable system, which can receive down linked commands and drill ahead in a specified direction and inclination. A steerable system that includes a mud motor with a bent sub may require a driller to manually orient the bent sub to control the direction and inclination, which may be less efficient. In one embodiment, the PowerDrive steerable system may be utilized. The PowerDrive is available from Schlumberger Limited, an oilfield service company that is incorporated in Netherlands Antilles and has a principle office in Houston, Tex.

Figure 20:
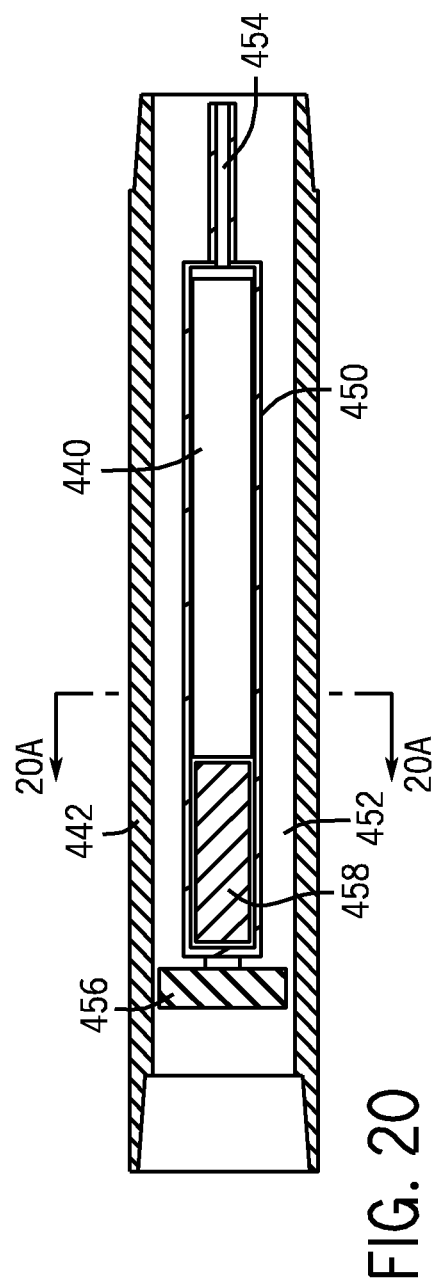
FIGS. 20 and 20A include cross-sectional views of a solenoid in accordance with exemplary embodiments.
Figure 20A:
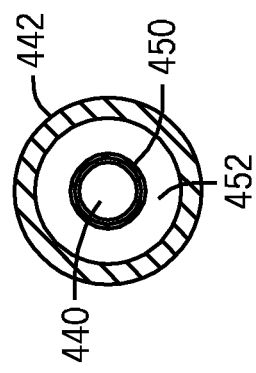

The BHA 422 also includes a solenoid 440, deployed in the second well 402. The solenoid 440 may be positioned in a drill collar 442 and may be capable of providing a magnetic field 444 for detection by the magnetometer systems 414 of the array 412. FIG. 20 includes a pair of cross-sectional views of the solenoid 440. The solenoid 440 may be mounted in the bore of the drill collar 442 (e.g., a non-magnetic drill collar) and aligned with the drill collar's axis. A housing 450 (e.g., a non-magnetic housing) may protect the windings of the solenoid 440 from the drilling fluid which flows in the annular region or mud channel 452 between the housing 450 and the drill collar 442. Operated in AC mode, the solenoid's magnetic field may readily penetrate the housing 450 and drill collar 442 at frequencies of 20 Hz and lower. An inter-tool communication bus 454 may connect the solenoid 440 to the other drilling tools in a BHA, such as an MWD tool. A turbine 456 may be used to generate electrical power for power and control electronics 458 of the solenoid 440, or batteries may be used to power the solenoid 440.

Because of the multiple magnetometers in the array 412, measurement results may be obtained based on a single solenoid position. Thus, the position of the solenoid 440 may be instantaneously and continuously monitored from the first well 402 while the second well 404 is being drilled. Indeed, the position of the BHA 422 in the second well 404 can be determined and transmitted to the surface continuously while drilling and there may be no need to periodically stop drilling to take MWD surveys. The magnetic field 444 produced by the solenoid 440 may be symmetric about the axis of the drill collar 442 in which the solenoid 440 is disposed. Thus, it is essentially immaterial whether the BHA 422 is rotating or non-rotating with regard to the magnetic field 444 it produces. Magnetic ranging data may be acquired while the BHA 422 is rotating and drilling ahead. In other words, it is unnecessary to stop drilling for the ranging process to proceed.

By utilizing the array 412 in conjunction with the solenoid 440 disposed within the BHA 422, rig time may be conserved relative to traditional procedures. For example, in one embodiment, the array 412 may include a sufficient number of magnetometer systems 414 to extend the full length or a substantial portion of the full length of the first well 402, which facilitates making measurements and drilling without moving the magnetometer systems 414. Indeed, in this embodiment, once the array 412 is installed, no time may be required to drive a tractor between data points while the second well 404 is being drilled. Eliminating the use of wireline tractors may also reduce downtime due to tractor reliability issues, damage to the liner or casing 406 caused by the tractor, and so forth. This can also reduce the number of personnel required at the rig site and allow for more automated ranging and steering processes. Further, additional efficiency may be realized when several wells are to be drilled parallel to the first well 402 because the array 412 may be left in the first well 402, which provides further time savings.

It should be noted that while the array 412 may be sufficient to extend the length of the first well 402, in some exemplary embodiments, a shorter array with fewer magnetometers may be utilized. For example, the array 412 may include at least two magnetometers that may be moved periodically during drilling. However, it is believed that operational efficiency will generally improve with additional magnetometers. For example, if there are two magnetometers with 30 m spacing between them, they generally have to be moved every time the well is drilled ahead 30 m. If there are four magnetometers with 30 m spacing, then the array 412 may have to be moved every time the well is drilled ahead 90 m. If there are eight magnetometers with 30 m spacing, then the array 412 may have to be moved every time the well is drilled ahead 120 m, and so on.

Figure 21:
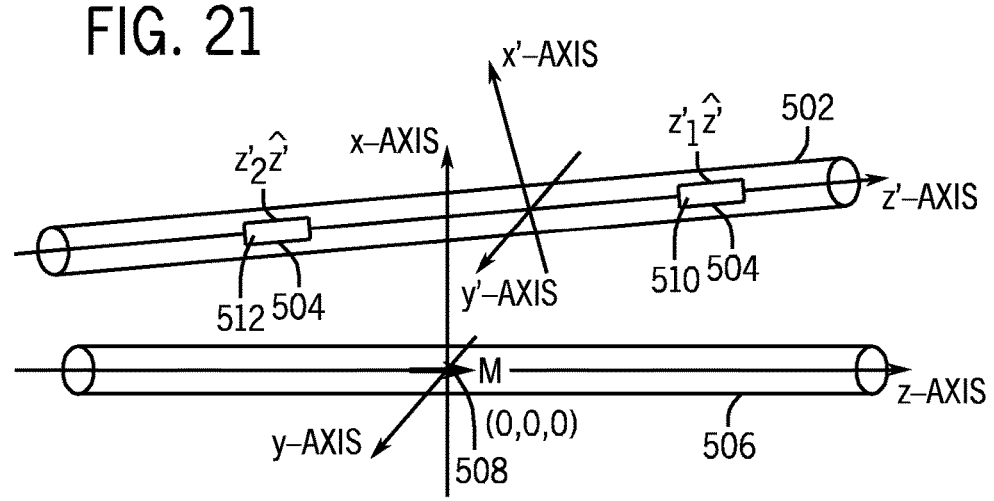
FIGS. 21 and 22 are perspective views that illustrate the geometry of a first well containing a plurality of magnetometers and a second well containing a magnetic dipole or solenoid in accordance with exemplary embodiments.
Figure 22:
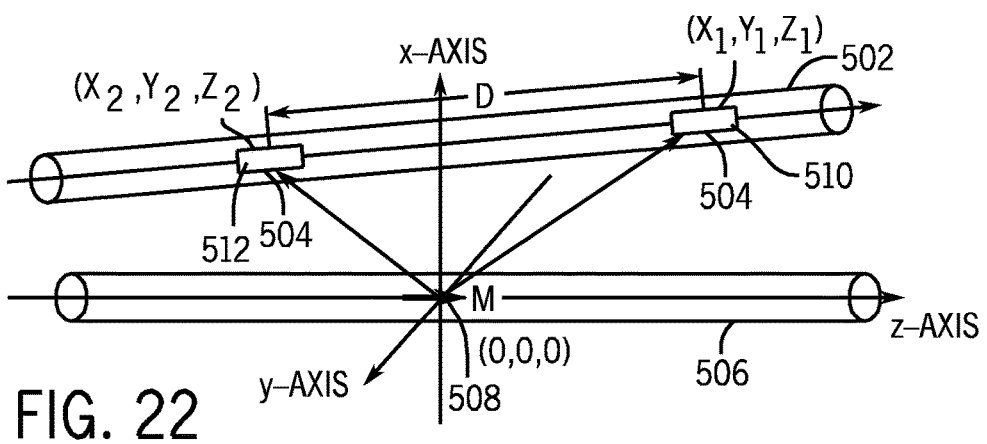

FIGS. 21 and 22 are perspective views that illustrate the geometry of a first well 502 containing a plurality of magnetometers 504 and a second well 506 containing a magnetic dipole or solenoid 508 in accordance with an exemplary embodiment of the present invention. Specifically, FIGS. 21 and 22 illustrate a pair of magnetometers 504, including a first magnetometer 510 and a second magnetometer 512. The pair of magnetometers 504 may be representative of a pair of magnetometers selected from an array of magnetometers (e.g., the array 412 illustrated in FIGS. 18 and 19) based on their proximity to the solenoid 508. Indeed, the pair of magnetometers 504 within an array that are closest to the solenoid 508 may be used to determine the position of the solenoid 508 with respect to the two magnetometers 504.

The following discussion relates to an implementation of an exemplary embodiment involving SAGD wells, as illustrated by FIGS. 21 and 22. However, exemplary embodiments may also be applicable to any situation where two or more wells are drilled in an approximately parallel configuration. For SAGD, a pair of horizontal wells is to be drilled whereby the position of the second well relative to the first well is determined using magnetic field measurements. For the purposes of explaining this exemplary embodiment, the direction and inclination data for the first well 502 and the second well 506 are assumed to be known from standard MWD direction and inclination measurements or from wireline direction and inclination measurements or gyro surveys. However, this condition may be modified later by eliminating the need for MWD direction and inclination for the second well 506. In general, a horizontal well's direction can be measured and controlled to approximately ±3°, and its inclination can be measured and controlled to ±1°, using conventional MWD sensors and good directional steering practices. However, such relatively small angles can produce large errors in the position of a long horizontal well. For example, a 1000 m long horizontal well with a 3° drift in direction results in a 52 m lateral error at the toe of the well; while a 1° drift in inclination results in a 17 m vertical error.

For the first part of the theoretical model discussed with regard to FIGS. 21 and 22, the direction and inclination are assumed to be known quantities for both wells, but the position of the solenoid 508 with respect to the first well 502 is an unknown quantity. The position is described by three coordinates (x',y',z') which will be the goal of the magnetic ranging measurements. For the second step, the requirement of knowing the direction and inclination of the solenoid 508 will be removed so that the direction and inclination of the BHA is also determined without the need for an MWD direction and inclination survey.

In FIG. 21, two different coordinate systems are assigned to the two wells 502, 506. The coordinate system assigned to the first well 502 is designated using primed quantities, e.g. $(x',y',z')=x'\hat{x}'+y'\hat{y}'+z'\hat{z}'$, where $\hat{x}'$, $\hat{y}'$ and $\hat{z}'$ are unit vectors. The coordinate system assigned to the second well 506 is designated using unprimed quantities, e.g. $(x,y,z)=x\hat{x}+y\hat{y}+z\hat{z}$, where $\hat{x}$, $\hat{y}$, and $\hat{z}$ are different unit vectors. The unit vector pointing along the axis of the first well 502 is $\hat{z}'$, and the unit vector pointing along the axis of the second well 506 is $\hat{z}$. Keeping with the example of horizontal SAGD wells, the unit vectors $\hat{y}'$, $\hat{z}'$, $\hat{y}$ and $\hat{z}$ are nearly horizontal. The unit vectors $\hat{x}'$, and $\hat{x}$ are on the high side of the holes (i.e. nearly vertical). However, these conditions are not required for the method.

The solenoid 508 is located at the origin of the unprimed coordinate system, centered at $(x,y,z)=(0,0,0)$. To simplify the magnetic field equations, the solenoid 508 is represented as a point magnetic dipole $\vec{M}=M\hat{z}$. A non-magnetic drill collar, which may surround the solenoid 508, will not significantly perturb the shape of the magnetic field produced by the solenoid 508, but any differences can be taken into account with a slight refinement of the model.

The coordinate system for the first well 502 is known since it is associated with the completed well. The location of the solenoid 508 (in the primed coordinates) is unknown and to be determined by the magnetic ranging measurements. It is possible to set up the mathematical problem such that all equations are cast in the primed coordinates of the first well 502. However, the theoretical treatment becomes much easier if the problem is stated in terms of the unprimed coordinates. In this formulation, the position of the solenoid 508 is treated as the known quantity and the positions of the two magnetometers 510, 512 are treated as unknown quantities. After solving for the magnetometer locations in the unprimed coordinate system, one can then transform the result such that the solenoid position is described in the primed coordinates of the first well 502.

In FIG. 22, the two magnetometers 504 are located at $\vec{r}_1=(x_1,y_1,z_1)=x_1\hat{x}+y_1\hat{y}+z_1\hat{z}$ and $\vec{r}_2=(x_2,y_2,z_2)=x_2\hat{x}+y_2\hat{y}+z_2\hat{z}$. These two vectors are treated as unknown quantities; however, the distance between the two magnetometers 504 is known, $$D=\sqrt{(x_1-x_2)^2+(y_1-y_2)^2+(z_1-z_2)^2}. \quad (eq.\ 6)$$

Meanwhile the locations of the magnetometers 504 in the primed coordinate system are $\vec{r}_1'=x_1'\hat{x}'+y_1'\hat{y}'+z_1'\hat{x}'=z_1'\hat{x}'$ and $\vec{r}_2'=x_2'\hat{x}'+y_2'\hat{y}'+z_2'\hat{z}'=z_2'\hat{z}'$. Since the magnetometers 504 are located on the $\hat{z}'$ axis, $x_1'=y_1'=x_2'=y_2'=0$ and $D=z_1'-z_2'$.

Figure 23:
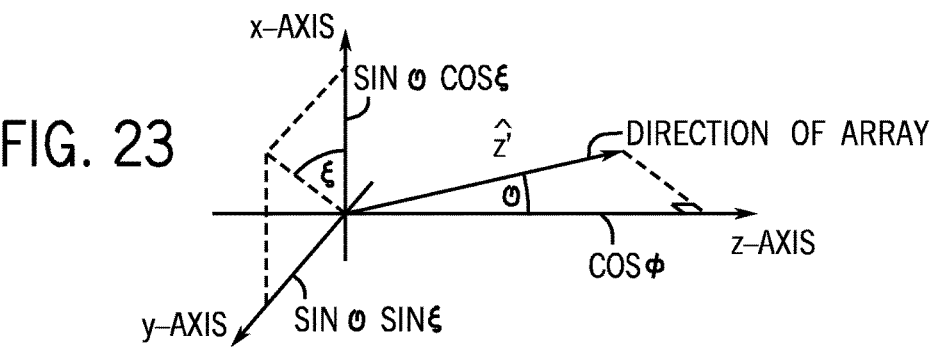
FIGS. 23 and 24 are geometric representations of orientation of a first well containing magnetometers with respect to a second well containing a solenoid in accordance with exemplary embodiments.
Figure 24:
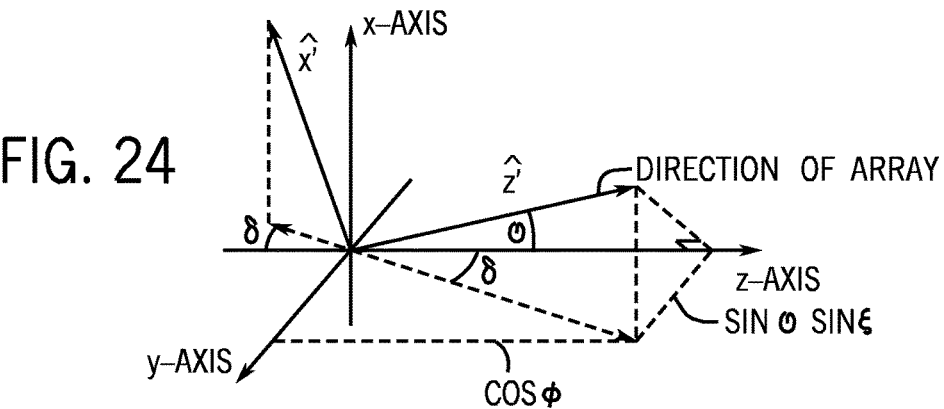

As illustrated in FIG. 23, the angle between $\hat{z}$ and $\hat{z}'$ is designated as $\varphi$, where $\varphi \in [0,\pi]$. The angle between the projection of $\hat{z}'$ into the x-y plane and $\hat{x}$, axis is designated as $\xi$, where $\xi \in [-\pi,\pi]$. The unit vector $\hat{z}'$ can be written in terms of the unprimed coordinate system as $$\hat{z}'=\sin \varphi \cos \xi \hat{x}+\sin \varphi \sin \xi \hat{y}+\cos \varphi \hat{z}. \quad (eq.\ 7)$$

From equation (7) and from $\vec{r}_1=\vec{r}_2+D\hat{z}'$ it follows that $$x_1=x_2+D \cos \xi \sin \varphi, \quad (eq.\ 8)$$

$$y_1=y_2+D \sin \xi \sin \varphi, \text{ and} \quad (eq.\ 9)$$

$$z_1=z_2+D \cos \varphi. \quad (eq.\ 10)$$

Note that the direction and inclination are not the angles $\varphi$ and $\xi$, but are related to them via trigonometry.

Since the two wells can be maintained nearly parallel, $\varphi$ and $\xi$ will be small angles, i.e. $\varphi \ll 1$, and $|\xi| \ll 1$. Subsequent equations can be simplified with the approximations $\cos \varphi \approx 1-\varphi^2/2$, $\sin \varphi \approx \varphi$, and $\sin \xi \approx \xi$. For the typical direction and inclination errors of $\pm 3°$ and $\pm 1°$, these approximations introduce very small errors.

In the primed coordinate system, the high side of the hole is indicated by $\hat{x}'$, which must lie in the plane defined by $\hat{z}$ and $\hat{x}$. Hence, the projection of $\hat{x}'$ into the y-z plane must be co-linear with the projection of into the y-z plane, as shown in FIG. 23. The angle between the projection of $\hat{z}'$ into the y-z plane and $\hat{z}$ is given by $\tan \delta = \tan \varphi \sin \xi$. The other two unit vectors of the primed coordinate system can be expanded in terms of the unprimed coordinate system as: $\hat{x}' = a\hat{x}+b\hat{y}+c\hat{z}$ and $\hat{y}' = d\hat{x}+e\hat{y}+f\hat{z}$. The transformation matrices between the two coordinate systems can be derived from the following additional conditions: $b/c = \tan \delta$, $\hat{x}' \cdot \hat{y}' = 0$, $\hat{x}' \cdot \hat{z}' = 0$, $\hat{y}' \cdot \hat{z}' = 0$, $|\hat{x}'|=1$, $|\hat{y}'|=1$, and $|\hat{z}'|=1$. The transformation matrices between the two coordinate systems are:

$$\begin{bmatrix} \hat{x}' \\ \hat{y}' \\ \hat{z}' \end{bmatrix} = \begin{bmatrix} (1-\varphi^2/2) & 0 & -\varphi \\ 0 & 1 & -\xi\varphi \\ +\varphi & +\xi\varphi & (1-\varphi^2/2) \end{bmatrix} \begin{bmatrix} \hat{x} \\ \hat{y} \\ \hat{z} \end{bmatrix} \quad (eq.\ 11)$$

and $$\begin{bmatrix} \hat{x} \\ \hat{y} \\ \hat{z} \end{bmatrix} = \begin{bmatrix} (1-\varphi^2/2) & 0 & +\varphi \\ 0 & 1 & +\xi\varphi \\ -\varphi & -\xi\varphi & (1-\varphi^2/2) \end{bmatrix} \begin{bmatrix} \hat{x}' \\ \hat{y}' \\ \hat{z}' \end{bmatrix}. \quad (eq.\ 12)$$

These transformations between the primed and unprimed coordinate systems are used to transform the magnetic field as well as the spatial coordinates.

The magnetic field due to the point magnetic dipole $\vec{M}=M\hat{z}$ can be written as $$\vec{B}(\vec{r}) = \frac{\mu_0}{4\pi r^3}[3\hat{r}(\hat{r}\cdot \vec{M}) - \vec{M}], \quad (eq.\ 13)$$

where $\hat{r}=\vec{r}/r$ is the unit vector from the origin (0,0,0) of the unprimed coordinate system to the point of observation, and where $r=|\vec{r}|=\sqrt{x^2+y^2+z^2}$. The magnetic field at $\vec{r}$ can be decomposed into three components:

$$\vec{B}(\vec{r}) = B_x(\vec{r})\hat{x} + B_y(\vec{r})\hat{y} + B_z(\vec{r})\hat{z}, \text{ where} \quad (eq.\ 14)$$

$$B_x(\vec{r}) = \frac{3\mu_0 M}{4\pi}\left(\frac{xz}{r^5}\right), \quad (eq.\ 15)$$

$$B_y(\vec{r}) = \frac{3\mu_0 M}{4\pi}\left(\frac{yz}{r^5}\right), \text{ and} \quad (eq.\ 16)$$

$$B_z(\vec{r}) = \frac{3\mu_0 M}{4\pi}\left(\frac{z^2-r^2/3}{r^5}\right). \quad (eq.\ 17)$$

An advantage of expressing the magnetic field in the unprimed coordinates is the simplicity of these three expressions. The magnetic fields at the two magnetometers are $$\vec{B}(\vec{r}_1) = B_x(\vec{r}_1)\hat{x} + B_y(\vec{r}_1)\hat{y} + B_z(\vec{r}_1)\hat{z}, \text{ and} \quad (eq.\ 18)$$

$$\vec{B}(\vec{r}_2) = B_x(\vec{r}_2)\hat{x} + B_y(\vec{r}_2)\hat{y} + B_z(\vec{r}_2)\hat{z}. \quad (eq.\ 19)$$

All six magnetic field components can be measured by the two three-axis magnetometers 504 in the first well 502. The magnetic fields measured by the first magnetometer 510 and the second magnetometer 512 in the primed coordinate system are $$\vec{\widetilde{B}_1} = \widetilde{B_{1x'}}\cdot \hat{x}' + \widetilde{B_{1y'}}\cdot \hat{y}' + \widetilde{B_{1z'}}\cdot \hat{z}', \text{ and} \quad (eq.\ 20)$$

$$\vec{\widetilde{B}_2} = \widetilde{B_{2x'}}\cdot \hat{x}' + \widetilde{B_{2y'}}\cdot \hat{y}' + \widetilde{B_{2z'}}\cdot \hat{z}'. \quad (eq.\ 21)$$

The tilde indicates that these are measured quantities, not theoretical quantities. A tilde will be used throughout to indicate either a measured quantity or the result of a calculation using a measured quantity. The magnetometer axes do not coincide with the $\hat{x}$-$\hat{y}$-$\hat{z}$ directions, but it is a simple matter to transform the magnetometer readings from the primed coordinate system into the unprimed coordinate system via $$\begin{bmatrix} \tilde{B}_x \\ \tilde{B}_y \\ \tilde{B}_z \end{bmatrix} = \begin{bmatrix} (1-\varphi^2/2) & 0 & +\varphi \\ 0 & 1 & +\xi\varphi \\ -\varphi & -\xi\varphi & (1-\varphi^2/2) \end{bmatrix} \begin{bmatrix} \tilde{B}_{x'} \\ \tilde{B}_{y'} \\ \tilde{B}_{z'} \end{bmatrix}. \quad (eq.\ 22)$$

Figure 25:
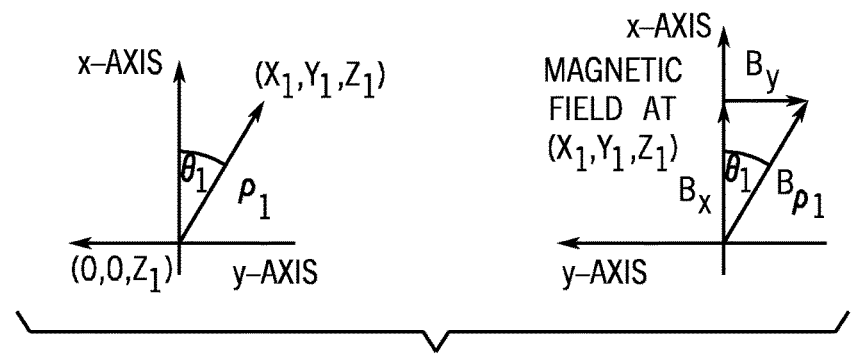
FIGS. 25 and 26 are representations of magnetic field components measured along a first well containing magnetometers with respect to a solenoid contained in a second well in accordance with exemplary embodiments.
Figure 26:
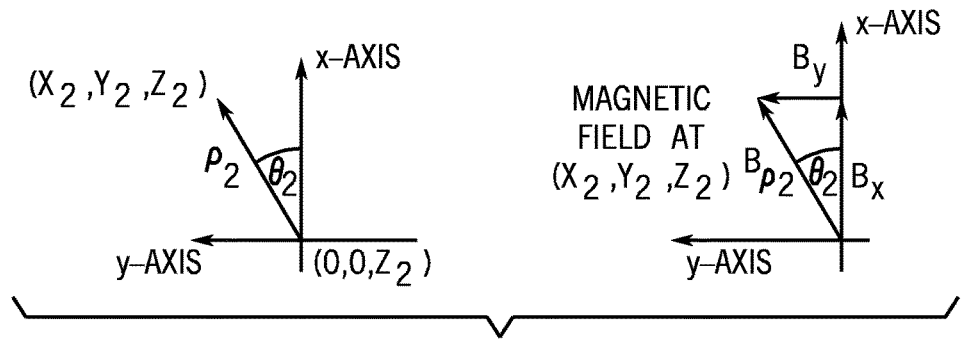

FIGS. 25 and 26 includes graphs representing geometry for field components measured at $\vec{r}_1=(x_1,y_1,z_1)$ and at $\vec{r}_2=(x_2,y_2,z_2)$. As illustrated in FIG. 25, the magnetic field at $\vec{r}_1$ lies in a plane defined by $\hat{z}$ and the radial vector $\vec{\rho}_1$, where $\vec{\rho}_1 = x_1\hat{x}+y_1\hat{y}$. Hence, the magnetic field has components only in the $\hat{z}$ direction and in the radial direction $\vec{\rho}_1$, where $\hat{\rho}_1 = \vec{\rho}_1/\rho_1$ is a unit vector and $\rho_1 = \sqrt{x_1^2+y_1^2}$. The magnetic field component in the radial direction is $$\vec{B}_{\rho 1}(\vec{r}_1) = B_{\rho 1}(\vec{r}_1)\hat{\rho} = B_x(\vec{r}_1)\hat{x} + B_y(\vec{r}_1)\hat{y}. \quad (eq.\ 23)$$

The direction of $\vec{B}_{\rho 1}(\vec{r}_1)$ in the x-y plane is given by $$\tan\theta_1 = \frac{B_y(\vec{r}_1)}{B_x(\vec{r}_1)}. \quad (eq.\ 24)$$

Hence, the measured magnetic field components, $\widetilde{B_{1x}}$ and $\widetilde{B_{1y}}$, determine the direction $\tilde{\theta}_1$ from a point on the axis of the first well at $(0,0,z_1)$ to the first magnetometer by $$\tan\tilde{\theta}_1 = \frac{\widetilde{B_{1y}}}{\widetilde{B_{1x}}}, \quad (eq.\ 25)$$

where the tilde indicates a quantity derived from measurements. One unknown quantity has been eliminated with $$y_1 = x_1 \tan \tilde{\theta}_1. \quad (eq.\ 26)$$

When a magnetometer is directly across from the solenoid 508, $z \to 0$, then $B_\rho \to 0$ and the angle $\theta$ is indeterminate. When the magnetometer is very far from the solenoid 508, then the magnetic fields are weak and the result is noisy.

Referring to FIG. 25, the magnetic field measured at the second magnetometer 512 is given by $\widetilde{B_{2x}}$, $\widetilde{B_{2y}}$, and $\widetilde{B_{2z}}$. The direction $\tilde{\theta}_2$ from a point on the axis of the first well 502 at $(0, 0, z_2)$ to the second magnetometer 512 is found with $$\tan\tilde{\theta}_2 = \frac{\widetilde{B}_{2y}}{\widetilde{B}_{2x}}. \quad \text{(eq. 27)}$$

This eliminates another unknown quantity with $$y_2 = x_2 \tan \tilde{\theta}_2. \quad \text{(eq. 28)}$$

It should be noted that that $\tilde{\theta}_2$ is not necessarily the same angle as $\tilde{\theta}_1$, i.e. the two wells may not lie in a plane.

Define the quantities $$\tilde{\alpha} \equiv \frac{\widetilde{B}_{1z}}{\widetilde{B}_{\rho 1}} = \frac{2u^2-1}{3u} :, \text{ where} \quad \text{(eq. 29)}$$

$$\widetilde{B}_{\rho 1} = \sqrt{(\widetilde{B}_{1x})^2 + (\widetilde{B}_{1y})^2} :, \text{ and} \quad \text{(eq. 30)}$$

$$u \equiv \frac{z_1}{\rho_1} = \frac{z_1}{\sqrt{x_1^2+y_1^2}}. \quad \text{(eq. 31)}$$

Equation (29) is a quadratic equation $$2u^2 - 3\tilde{\alpha}u - 1 = 0 \quad \text{(eq. 32)}$$

with two solutions $$\tilde{u} = \frac{3\tilde{\alpha} \pm \sqrt{9\tilde{\alpha}^2+8}}{4}. \quad \text{(eq. 33)}$$

These two roots are known quantities from measured data. For nearly parallel wells, the + sign corresponds to $z_1 > 0$ and the − sign corresponds to $z_1 < 0$.

Similarly, define the quantities $$\tilde{\beta} \equiv \frac{\widetilde{B}_{2z}}{\widetilde{B}_{\rho 2}} = \frac{2v^2-1}{3v} :, \text{ where} \quad \text{(eq. 34)}$$

$$v \equiv \frac{z_2}{\rho_2} = \frac{z_2}{\sqrt{x_2^2+y_2^2}} \text{ and} \quad \text{(eq. 35)}$$

$$\widetilde{B}_{\rho 2} = \sqrt{(\widetilde{B}_{2x})^2 + (\widetilde{B}_{2y})^2}. \quad \text{(eq. 36)}$$

Equation (34) is a quadratic equation $$2v^2 - 3\tilde{\beta}v - 1 = 0, \quad \text{(eq. 37)}$$

with two solutions $$\tilde{v} = \frac{3\tilde{\beta} \pm \sqrt{9\tilde{\beta}^2+8}}{4}. \quad \text{(eq. 38)}$$

These two roots are now known quantities derived from measurements. For nearly parallel wells, the + sign corresponds to $z_2 > 0$ and the − sign corresponds to $z_2 < 0$. Substituting the roots of equation (eq. 33) into equations (26) and (31) relates $z_1$ to $x_1$ via $$z_1 = \tilde{u}x_1\sqrt{1+\tan^2\tilde{\theta}_1}, \quad \text{(eq. 39)}$$

where $\tilde{u}$ and $\tan \tilde{\theta}_1$ are known quantities. Substituting the roots of equation (eq. 38) into equations (28) and (35) relates $z_2$ to $x_2$ via $$x_2 = \tilde{v}x_2\sqrt{1+\tan^2\tilde{\theta}_2}, \text{ where} \quad \text{(eq. 40)}$$

$\tilde{v}$ and $\tan \tilde{\theta}_2$ are known quantities. Combining equations (10), (39) and (40) yields $$z_1 - z_2 = D\cos\varphi = \tilde{u}x_1\sqrt{1+\tan^2\tilde{\theta}_1} - \tilde{v}x_2\sqrt{1+\tan^2\tilde{\theta}_2}. \quad \text{(eq. 41)}$$

Equation (41) can be rewritten as $$x_2 = \frac{\tilde{u}x_1\sqrt{1+\tan^2\tilde{\theta}_1} - D\cos\varphi}{\tilde{v}\sqrt{1+\tan^2\tilde{\theta}_2}}. \quad \text{(eq. 42)}$$

Combining equations (9), (26), and (28) yields $$x_1 \tan\tilde{\theta}_1 - x_2 \tan\tilde{\theta}_2 = D\sin\xi\sin\varphi, \quad \text{(eq. 43)}$$

which can be rewritten as $$x_2 = \frac{x_1\tan\tilde{\theta}_1 - D\sin\xi\sin\varphi}{\tan\tilde{\theta}_2}. \quad \text{(eq. 44)}$$

Setting these two equations for $x_2$ equal and solving for $x_1$ gives the solution $$\tilde{x}_1 = D\left\{\frac{\cos\varphi\tan\tilde{\theta}_2 - \tilde{v}\sin\xi\sin\varphi\sqrt{1+\tan^2\tilde{\theta}_2}}{\tilde{u}\tan\tilde{\theta}_2\sqrt{1+\tan^2\tilde{\theta}_1} - \tilde{v}\tan\tilde{\theta}_1\sqrt{1+\tan^2\tilde{\theta}_2}}\right\}. \quad \text{(eq. 45)}$$

If $\tan\theta_1 \approx 0$ and $\tan\theta_2 \approx 0$, then equation (45) may produce a noisy result. Alternatively, one can solve for $x_1$ using equation (8) instead of equation (9) to obtain $$\tilde{x}_1 = D\left\{\frac{\cos\varphi - \tilde{v}\sin\varphi\cos\xi\sqrt{1+\tan^2\tilde{\theta}_2}}{\tilde{u}\sqrt{1+\tan^2\tilde{\theta}_1} - \tilde{v}\sqrt{1+\tan^2\tilde{\theta}_2}}\right\}. \quad \text{(eq. 46)}$$

In both equations (45) and (46), the quantities: $\varphi$ and $\xi$ are assumed to be known, for example, from well survey data (direction and inclination), while $\tan\tilde{\theta}_1$, $\tan\tilde{\theta}_2$, $\tilde{u}$ and $\tilde{v}$ may be obtained from magnetic field measurements. Below, a method for obtaining $\varphi$ and $\xi$ from magnetometer data will be described.

It should be noted that there are four possible solutions for $\widetilde{x}_1$ since there are two roots for equation (33) and two roots for equation (38). However, three of the possible solutions can be easily eliminated due to the unrealistic values they produce. When $z_1 < 0$ the negative root of equation (33) is selected, and when $z_1 > 0$ the positive root of equation (33) is selected. When $z_2 < 0$ the negative root of equation (38) is selected, and when $z_2 > 0$ the positive root of equation (38) is selected.

The remaining unknown quantities for the first magnetometer 510 may now be found from:

$$\widetilde{y}_1 = \widetilde{x}_1 \tan\tilde{\theta}_1, \quad \text{(eq. 47)}$$

$$\widetilde{z}_1 = \tilde{u}\widetilde{x}_1\sqrt{1+\tan^2\tilde{\theta}_1} \quad \text{(eq. 48)}$$

Following the same line of reasoning the quantities for the second magnetometer 512 can be found $$\tilde{x}_2 = D \left\{ \frac{\bar{u}\sqrt{1+\tan^2\tilde{\theta}_1} \sin\xi\sin\varphi - \cos\varphi\tan\tilde{\theta}_1}{\bar{v}\tan\tilde{\theta}_1 \sqrt{1+\tan^2\tilde{\theta}_2} - \bar{u}\tan\tilde{\theta}_2\sqrt{1+\tan^2\tilde{\theta}_1}} \right\} \quad \text{(eq. 49)}$$

If $\tan \tilde{\theta}_1 \approx 0$ and $\tan \tilde{\theta}_2 \approx 0$, then equation (49) may produce a noisy result. Alternatively, one can solve for $x_2$ using $$\tilde{x}_2 = D \left\{ \frac{\cos\varphi - \bar{u}\sin\varphi\cos\xi\sqrt{1+\tan^2\tilde{\theta}_1}}{\bar{u}\sqrt{1+\tan^2\tilde{\theta}_1} - \bar{v}\sqrt{1+\tan^2\tilde{\theta}_2}} \right\}. \quad \text{(eq. 50)}$$

There are the same four roots for $\tilde{u}$ and $\tilde{v}$, but it is easy to select the proper root. The other two coordinates for the second magnetometer 512 can be calculated with $$\widetilde{y}_2 = \widetilde{x}_2 \tan \tilde{\theta}_2, \text{ and} \quad \text{(eq. 51)}$$

$$\widetilde{x}_2 = \tilde{v}\widetilde{x}_2 \sqrt{1+\tan^2 \tilde{\theta}_2}. \quad \text{(eq. 52)}$$

Hence, the positions of the two magnetometers 504 with respect to the unprimed system are determined, $(\widetilde{x}_1, \widetilde{y}_1, \widetilde{z}_1)$ and $(\widetilde{x}_2, \widetilde{y}_2, \widetilde{z}_2)$. These two points define a line in the unprimed coordinate system that corresponds to the axis of the first well 502.

Figure 27:
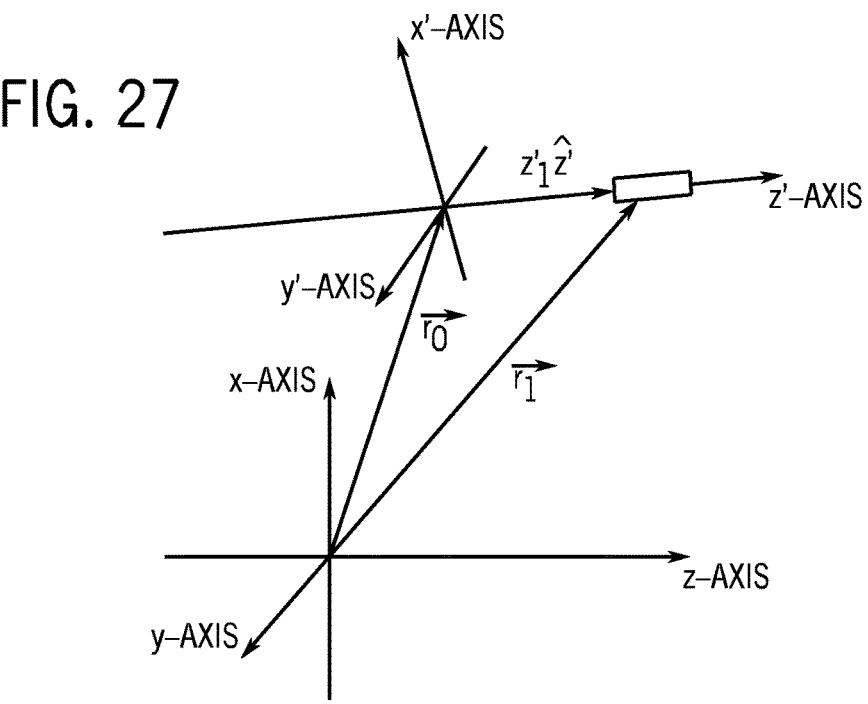
FIG. 27 illustrates geometric relationships between a pair of wells in accordance with exemplary embodiments.

However, the goal is to locate the position of the solenoid 508 with respect to the primed coordinate system of the first well 502. Hence the position of the solenoid 508 must be expressed in the primed coordinate system. Referring to FIG. 27, which illustrates geometric relationships between the wells 502, 506, $\vec{r}_0$ is a vector that points from the origin of the unprimed coordinate system to the origin of the primed coordinate system. Alternatively, $\vec{r}_M = -\vec{r}_0$ is a vector that points from the origin of the primed coordinate system to the origin of the unprimed coordinate system. The solenoid 508 is located at the position $$\vec{r}_M = -\vec{r}_0 = z_1'\vec{Z} - \vec{r}_1 = z_1'\vec{Z} - x_1\hat{x} - y_1\hat{y} - z_1\hat{z}. \quad \text{(eq. 53)}$$

Equation (11) can be used to transform the unprimed quantities in equation (53) into the primed quantities. This transformation gives the position of the solenoid 508 in primed coordinates:

$$\vec{r}_M = [-x_1(1-\varphi^2/2) + z_1\varphi]\widehat{X} - [y_1 - \xi\varphi z_1]\widehat{Y} + [z_1' - x_1\varphi - \xi\varphi y_1 - z_1(1-\varphi^2/2)]\widehat{Z}. \quad \text{(eq. 54)}$$

When the two wells 502, 506 are parallel such that $\varphi=0$ and $\xi=0$, equation (54) reduces to the expected result $$\vec{r}_M = -x_1\widehat{X} - y_1\widehat{Y} + [z_1' - z_1]\widehat{Z}. \quad \text{(eq. 55)}$$

The following two examples, which may be referred to as the third and fourth examples, are meant to illustrate methods and features described above. However, it should be noted that methods in accordance with exemplary embodiments are not limited to the parameters utilized in the following examples.

The third example may apply a method in accordance with an exemplary embodiment to a first well and a second well, such as the first and second wells 502, 506, that are substantially parallel and that are separated in the x' direction by 15 m, and separated in the y' direction by 0 m. In this example, the angles between the borehole axes of the two wells are $\varphi=0°$ and $\xi=0°$. Magnetometers in the first well are separated by D=30 m. Two adjacent magnetometers are located at $(x_1',y_1',z_1')=(0,0,15)$ and $(x_2',y_2',z_2')=(0,0,-15)$. The origin of the primed coordinate system is chosen as the mid-point between these two magnetometers, but this choice is not necessary for the calculation. The solenoid in the second well moves along the path described by the line x'=−15 m and y'=0 m. The calculation is carried out as the solenoid proceeds from z'=−15 m to z'=+15 m corresponding to increasing depth of the drill bit. With an array of magnetometers, a similar process would be performed for each adjacent pair of magnetometers, i.e. for each 30 m segment of the well.

Figure 28:
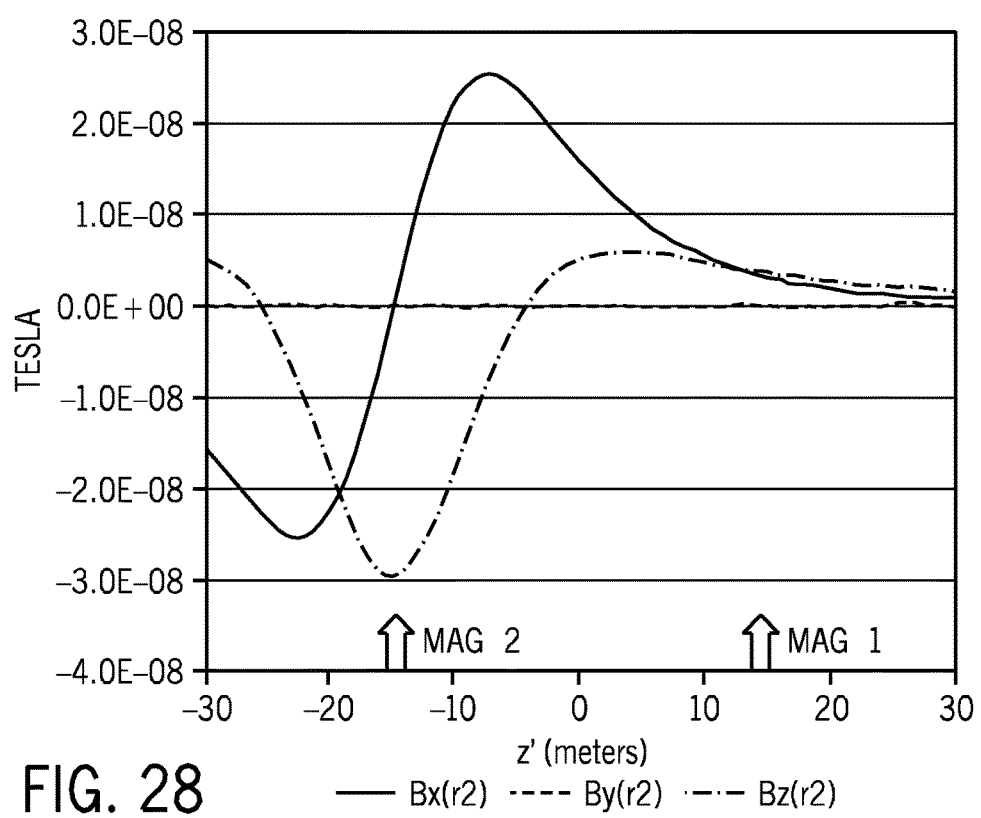
FIGS. 28 and 29 include graphs of example magnetic field measurements for magnetometers versus solenoid location, in accordance with exemplary embodiments.
Figure 29:
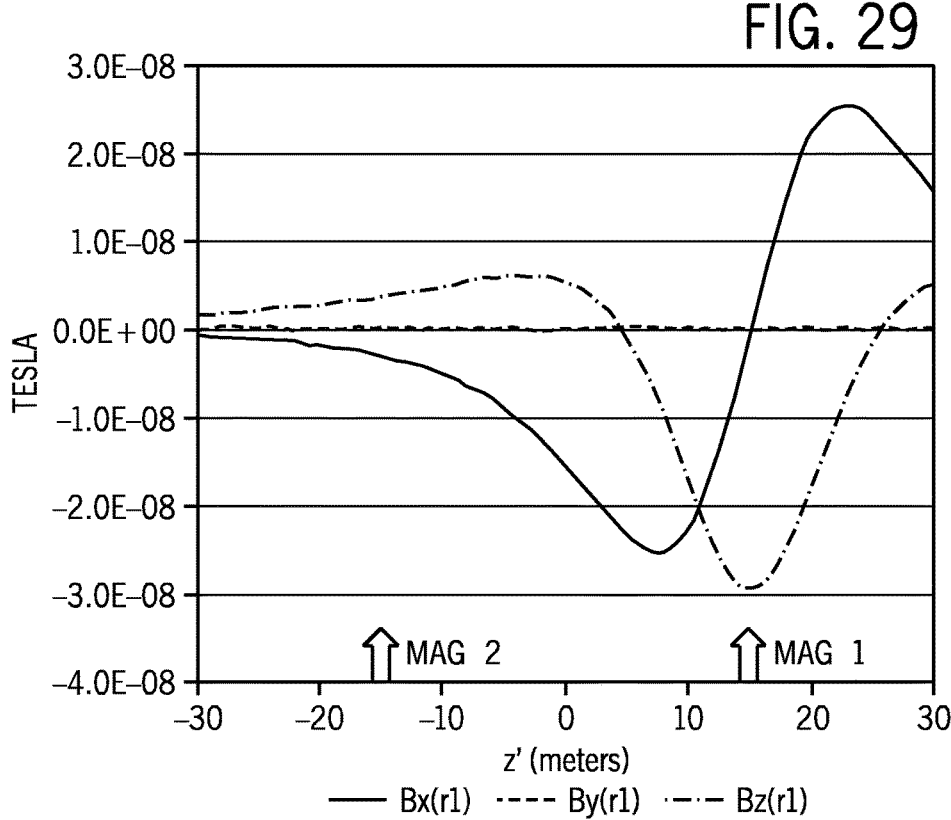

Taking into consideration a single fixed position of the solenoid, and using the above parameters, the magnetic field components $\{B_x(\vec{r}_1), B_y(\vec{r}_1), B_z(\vec{r}_1), B_x(\vec{r}_2), B_y(\vec{r}_{21}), B_z(\vec{r}_{21})\}$ are calculated at the two magnetometers using equations (15), (16) and (17). The magnetic dipole moment of the solenoid is assumed to be 1000 amp-m². Then random noise with a standard deviation of 0.1 nanoTesla is added to each magnetic field component to represent noise in each magnetometer axis. These six noisy values will be used as magnetic field "measurements" $\{\widetilde{B_{1x}}, \widetilde{B_{1y}}, \widetilde{B_{1z}}, \widetilde{B_{2x}}, \widetilde{B_{2y}}, \widetilde{B_{2z}}\}$. The magnetic field measurements are shown in FIG. 28 for the second magnetometer and in FIG. 29 for the first magnetometer. The magnetic field is first detected by the second magnetometer, and secondly detected by the first magnetometer as the solenoid's position along the z' direction increases. Because the solenoid is located in the y'=0 plane, there are no $\widetilde{B_{1y}}$ or $\widetilde{B_{2y}}$ field components, except for random noise. The maximum amplitude of $\widetilde{B_{2z}}$ occurs when the solenoid is opposite the second magnetometer at z'=−15 m, and $\widetilde{B_{2x}}$ passes through zero and changes sign. Similar behavior occurs in the readings from the first magnetometer when the solenoid is z'=+15 m.

Figure 30:
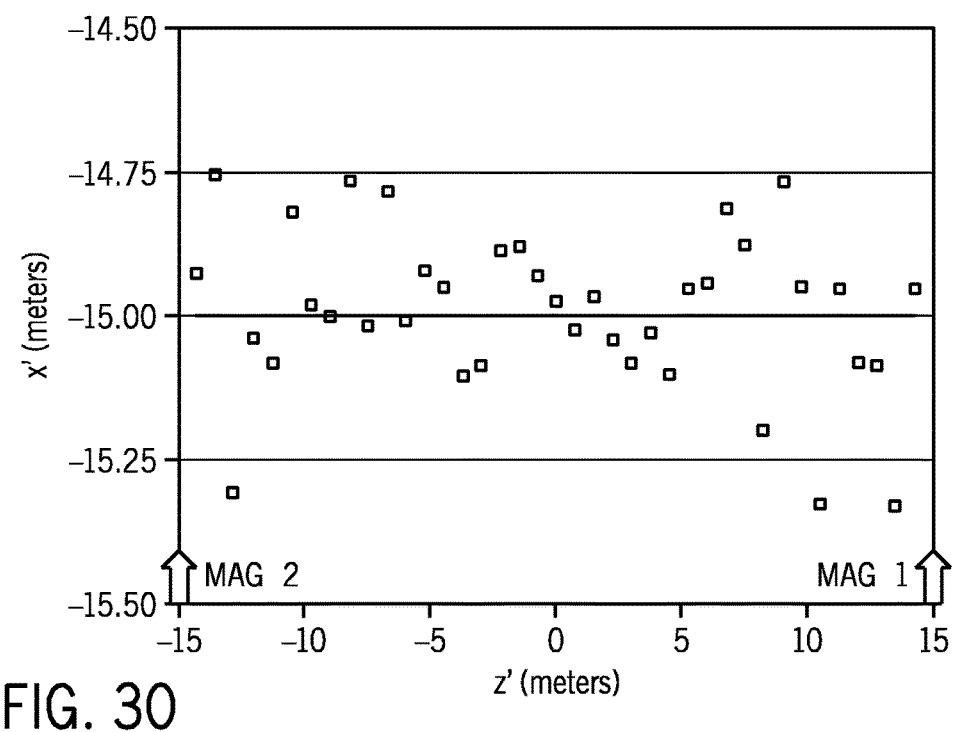
FIGS. 30, 31, 32, and 33 include graphs of example actual and estimated data in accordance with exemplary embodiments.

These magnetic field "measurements" are used to estimate the solenoid's position in the primed coordinate system using the process described by equations (25) through (55). Because $\tan \theta_1 \approx 0$ and $\tan \theta_2 \approx 0$, equations (46) and (51) are used to calculate $\widetilde{x}_1'$ and $\widetilde{x}_2'$. The results of the inversion are shown in FIGS. 30, 31, 32, and 33. Each datum in these figures represents the solution for a single solenoid position. Information from any other depth is not required. Referring to FIG. 30, the estimated positions $\widetilde{x}'$ are shown as data points, while the actual position of the solenoid (x'=−15 m) is indicated by the line. The standard deviation for the difference the actual and estimated quantities, $x' - \widetilde{x}'$, is 0.14 m and the average difference over all points is $\langle x' - \widetilde{x}' \rangle = -0.01$ m.

Figure 31:
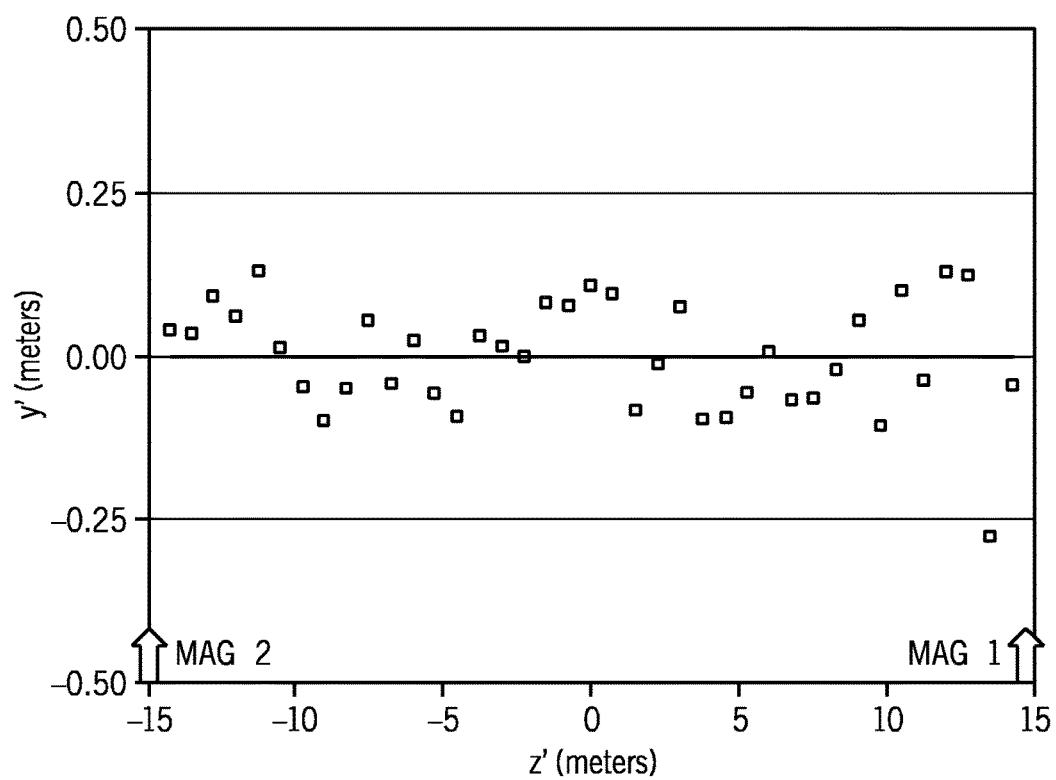

In FIG. 31, the estimated position $\tilde{y}$ is compared to the actual position, y'=0 m. For the region $-15 \leq z' \leq 0$, $\tilde{y}$ is calculated using equation (51). For the region $0 \leq z' \leq 15$, $\tilde{y}$ is calculated using equation (47). This is done because $$\tan\tilde{\theta} = \frac{\tilde{B}_y}{\tilde{B}_x}$$

can be noisy when the solenoid is far from the magnetometer. The second magnetometer is closest to the solenoid for $-15 \leq z' \leq 0$, and the first magnetometer is closest to the solenoid when $0 \leq z' \leq 15$. The standard deviation for the difference the actual and estimated quantities, $y' - \tilde{y}$, is 0.09 m and the average difference over all points is $|\langle y' - \tilde{y} \rangle| < 0.01$ m.

Figure 32:
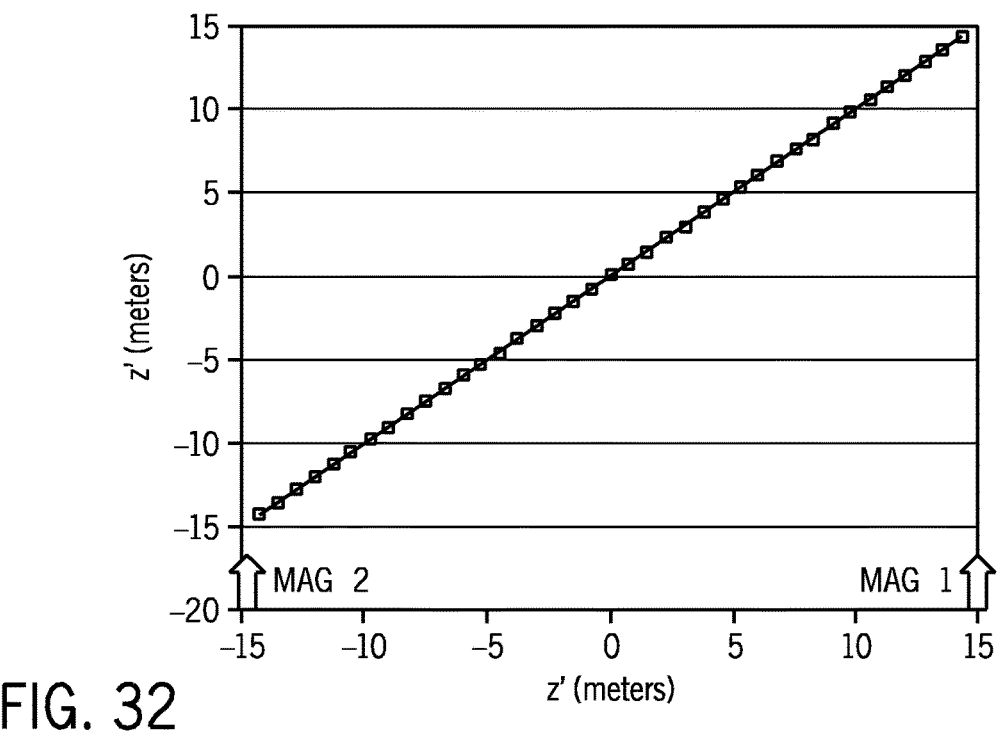
Figure 33:
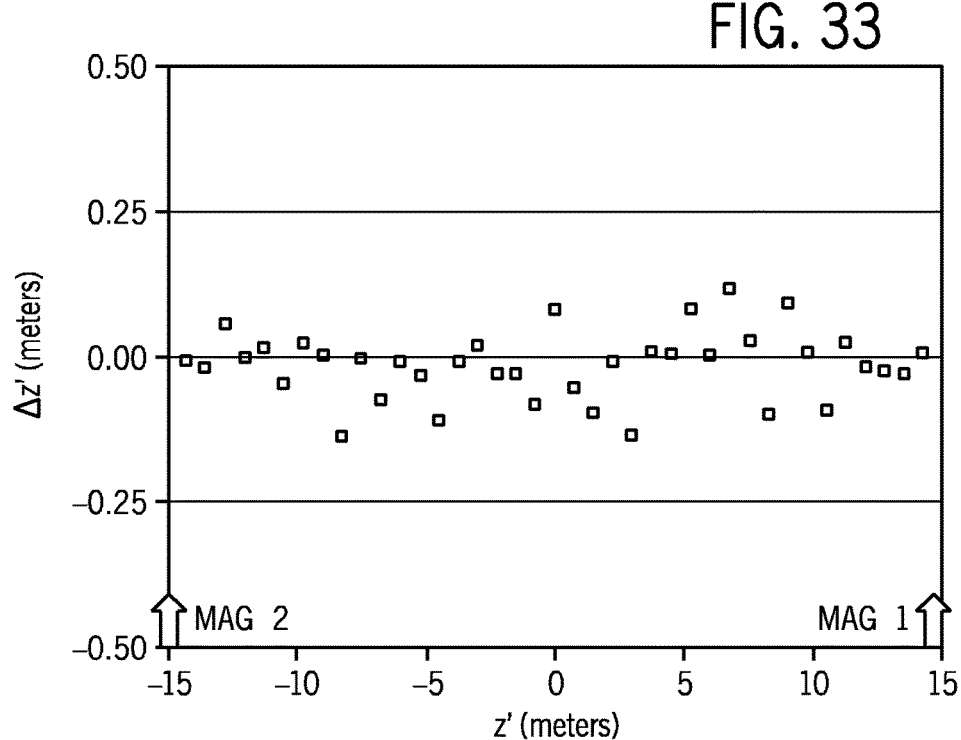

FIG. 32 shows the estimated position $\tilde{z}$ compared to the actual position $z'$, and FIG. 33 shows the difference $\Delta z' = z' - \tilde{z}$. The standard deviation for $\Delta z'$ is 0.06 m, and the average difference is $(\Delta z') = 0.01$ m. Hence, this method gives extremely good results for the conditions assumed in this example.

In accordance with an exemplary embodiment, three magnetometers may be used to locate the solenoid's position. For example, when the solenoid is close to a magnetometer (e.g. at $z' = -15$ m in the above cases), the data from a third, nearby magnetometer can be used to enhance the measurement accuracy. With a third magnetometer located at $(x_3', y_3', z_3') = (0, 0, -30)$, there may be as strong a magnetic field at this third magnetometer as at the first magnetometer. The estimated solenoid position obtained with the second and third magnetometer pair can be combined with the results from the first and second magnetometer pair to reduce statistical uncertainty.

The fourth example applies a method in accordance with an exemplary embodiment to two slightly non-parallel wells that are separated in the $x'$ direction by approximately 15 m, and separated in the $y'$ direction by 1 to 2 m. The angles between the two borehole axes of the wells are $\varphi = 3°$ and $\xi = 80°$. These angles correspond to the second well drifting primarily in the $y'$ direction, and to a lesser degree in the $x'$ direction. This could represent a practical situation where the wellbore direction (north-south-east-west) is more difficult to control than the inclination. As in the third example, the two magnetometers are located at $(x_1', y_1', z_1') = (0, 0, 15)$ and $(x_2', y_2', z_2') = (0, 0, -15)$, with $D = 30$ m. The solenoid position proceeds from $z' = -15$ m to $z' = +15$ m corresponding to increasing depth of the drill bit.

The magnetic field components $\{B_x(\vec{r}_1), B_y(\vec{r}_1), B_z(\vec{r}_1), B_x(\vec{r}_2), B_y(\vec{r}_{21}), B_z(\vec{r}_{21})\}$ are calculated using equations (15), (16) and (17) and random noise is added as in the third example. The resulting magnetic field "measurements" $\{\widetilde{B_{1x}}, \widetilde{B_{1y}}, \widetilde{B_{1z}}, \widetilde{B_{2x}}, \widetilde{B_{2y}}, \widetilde{B_{2z}}\}$ are used to determine the solenoid's position.

Figure 34:
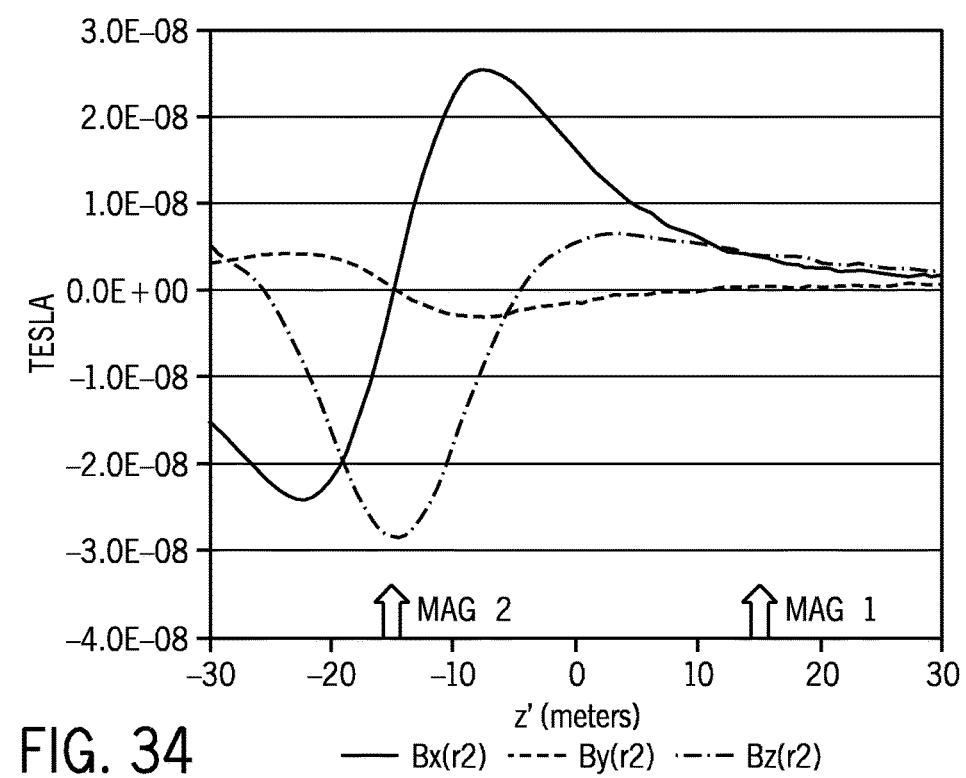
FIGS. 34 and 35 include graphs of example magnetic field measurements for magnetometers versus solenoid location, in accordance with exemplary embodiments.
Figure 35:
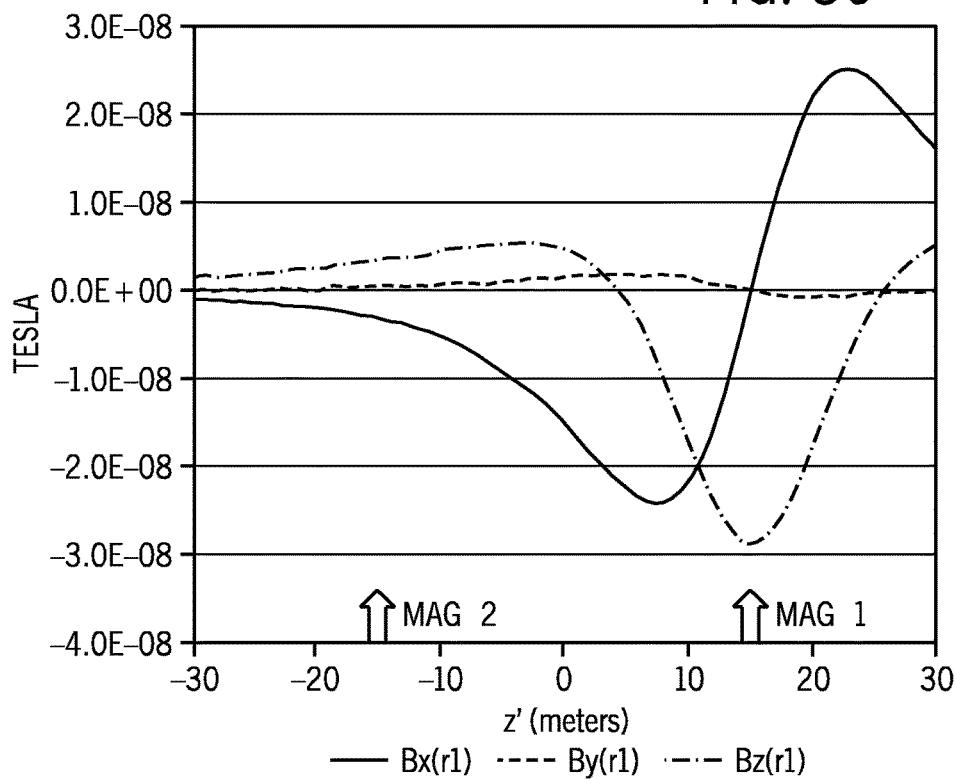

The magnetic field measurements are shown in FIGS. 34 and 35 for the second and first magnetometers, respectively. Because the solenoid is no longer located in the $y' = 0$ plane, there are non-zero $\widetilde{B_y}$ field components. The maximum amplitude of $\widetilde{B_{2x}}$ still occurs when the solenoid is opposite the second magnetometer, e.g. at $z' = -15$ m, and both $\widetilde{B_{2x}} = 0$ and $\widetilde{B_{2y}} = 0$.

Figure 36:
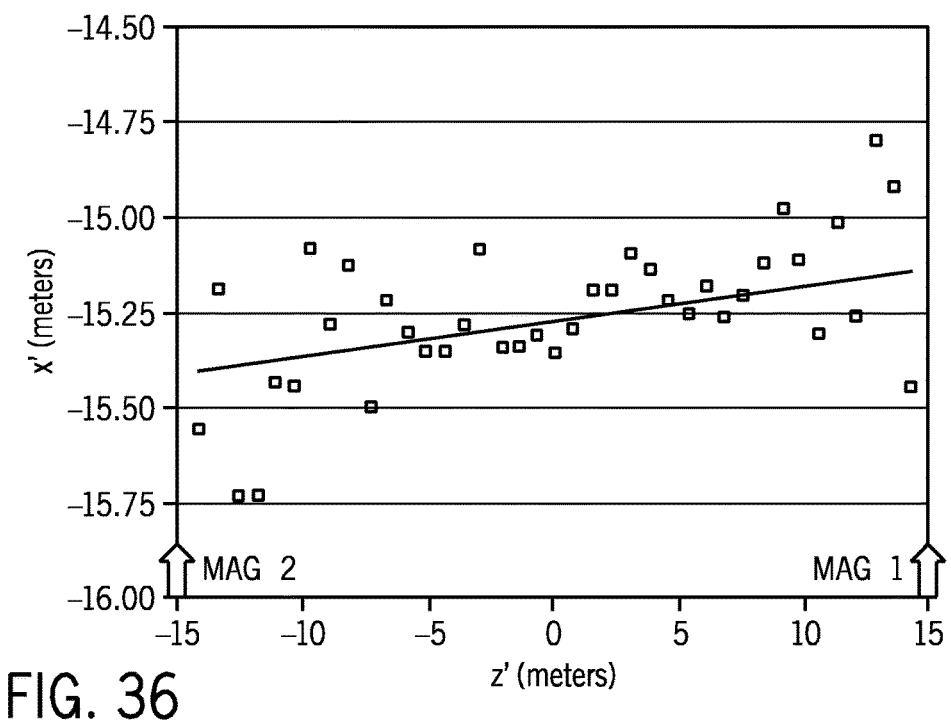
FIGS. 36, 37, 38, and 39 include graphs of example actual and estimated data in accordance with exemplary embodiments.

Following the same process as in the third example, the results for $\widetilde{x'}$, $\tilde{y}$, $\tilde{z}$, and $\Delta z'$ are shown in FIGS. 36, 37, 38, and 39. Referring to FIG. 36, the estimated position $\widetilde{x'}$ is shown as data points, while the actual solenoid coordinate is indicated by the line. The second well has an upward inclination and drifts by 0.26 m over 30 m of measured depth. The standard deviation for the difference between the actual and the estimated position, $x' - \widetilde{x'}$, is 0.16 m. The average difference over all points is $\langle x' - \widetilde{x'} \rangle = -0.02$ m.

Figure 37:
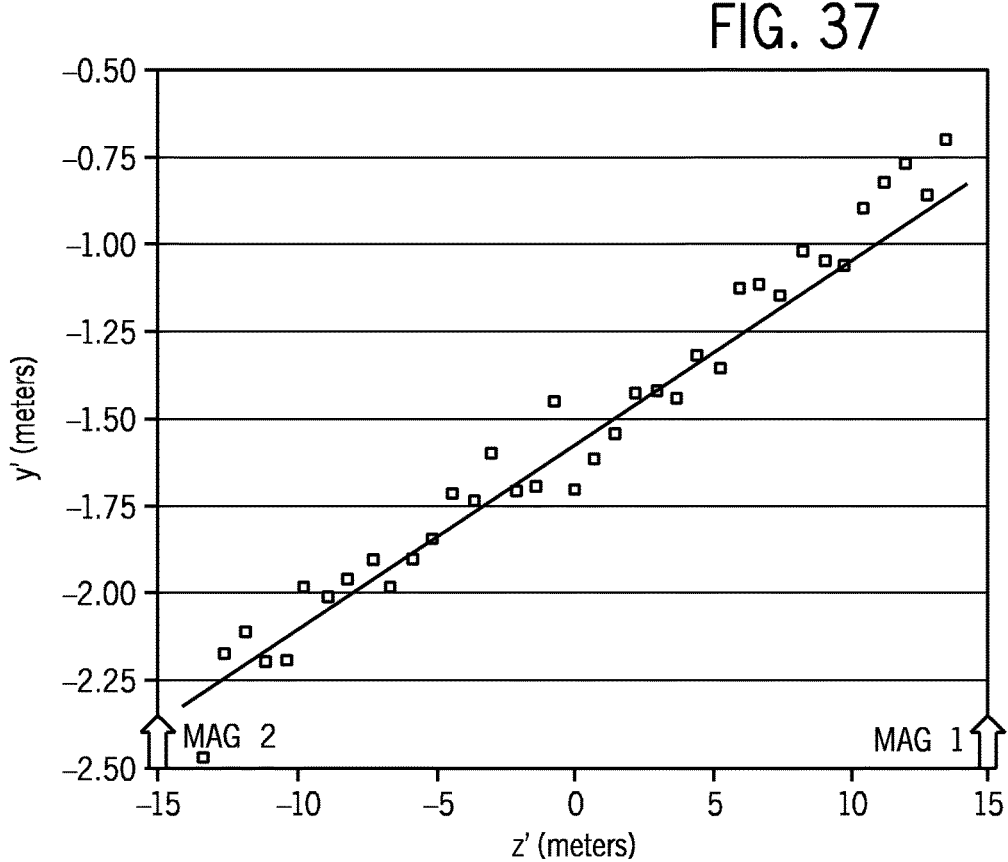

FIG. 37 shows the estimated position $\tilde{y}$ (data points) compared to the actual position (line). There is considerable lateral drift (1.47 m) over the 30 m measured depth. This degree of drift in direction is possible using standard MWD measurements and conventional accuracy in BHA steering. The standard deviation for the difference between the actual position and the estimated position, $y' - \tilde{y}$, is 0.21 m. The average difference over all points is $\langle y' - \tilde{y} \rangle = -0.05$ m.

Figure 38:
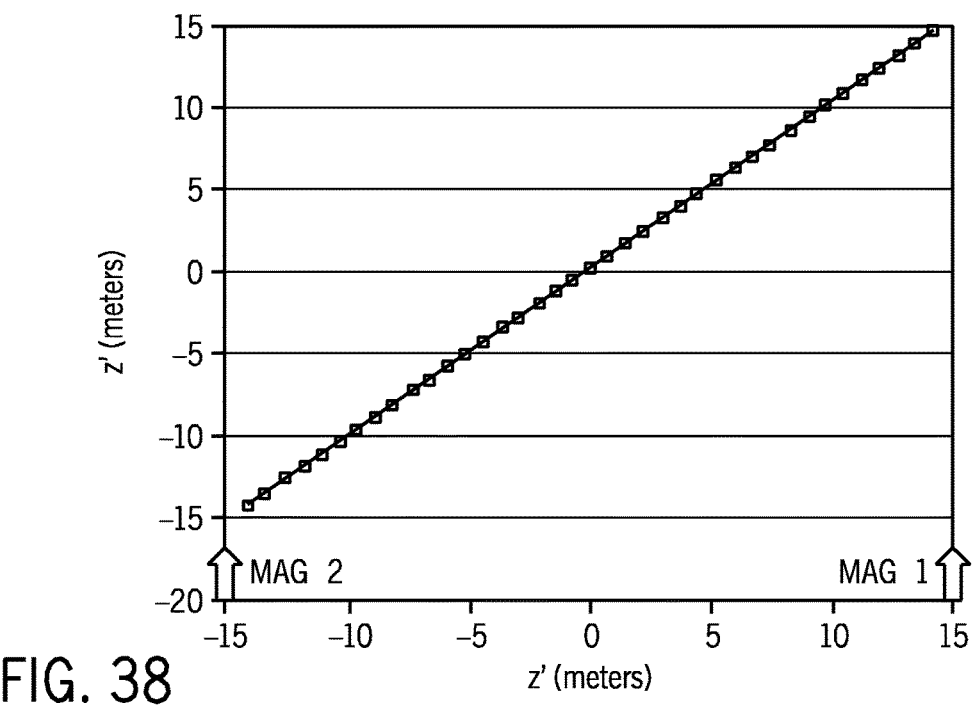
Figure 39:
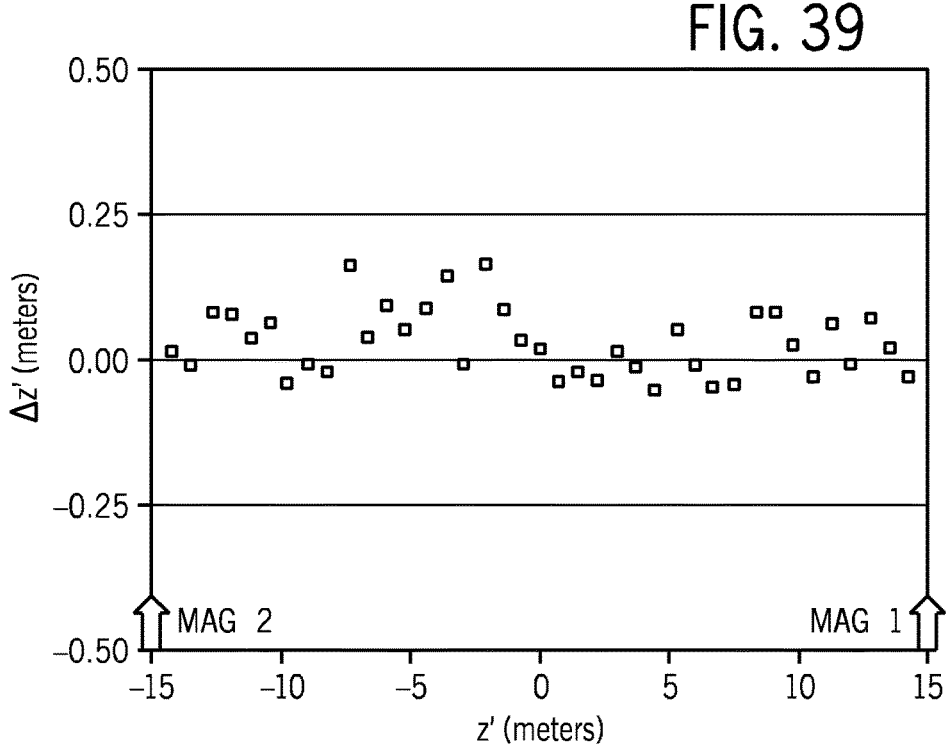

FIG. 38 shows the estimated position $\widetilde{x'}$, compared to the actual position, $z'$, and FIG. 39 shows the differences $\Delta z' = z' - \tilde{z}$. The standard deviation for $\Delta z'$ is 0.06 m. The average difference is $(\Delta z') = 0.03$ m. Hence, this method also gives very good results for non-parallel wells.

Returning to the discussion of the principles behind exemplary embodiments, it was stated above that the direction and inclination data are needed for both wells. This condition can be relaxed for the second well. The first well drilled in the formation will have MWD direction and inclination data versus depths, typically at depth intervals of 10 m, 20 m or 30 m, depending on the required accuracy for the well trajectory. After the well has been drilled, a wireline gyro survey can also be acquired to improve the accuracy of the well trajectory. Thus the direction and inclination of the first well is assumed to be known. The direction and inclination data for the second well can be obtained using standard MWD magnetometers to measure the Earth's magnetic field and on-board accelerometers to measure inclination. In this case, the drilling is typically suspended because the BHA should remain stationary during the survey period. Afterwards, the MWD tool transmits the data to surface so that the driller can review and possibly adjust the steerable system in the BHA.

In one method in accordance with an exemplary embodiment, acquiring direction and inclination data for the second well is achieved by processing the data acquired with the magnetometer array. In this approach, there is no need to stop the BHA to acquire MWD survey data. In fact, it is possible to eliminate the MWD tool entirely since the direction and inclination data can be provided by the magnetometer array in the first well. It should be noted that an assumption for this approach is that the trajectory of the second well can be represented by a simple curve over a short distance. For two parallel wells, the trajectory can be treated as piecewise linear over short distances. The method can be extended to curved trajectories described by a simple curve, such as an arc.

Figure 40:
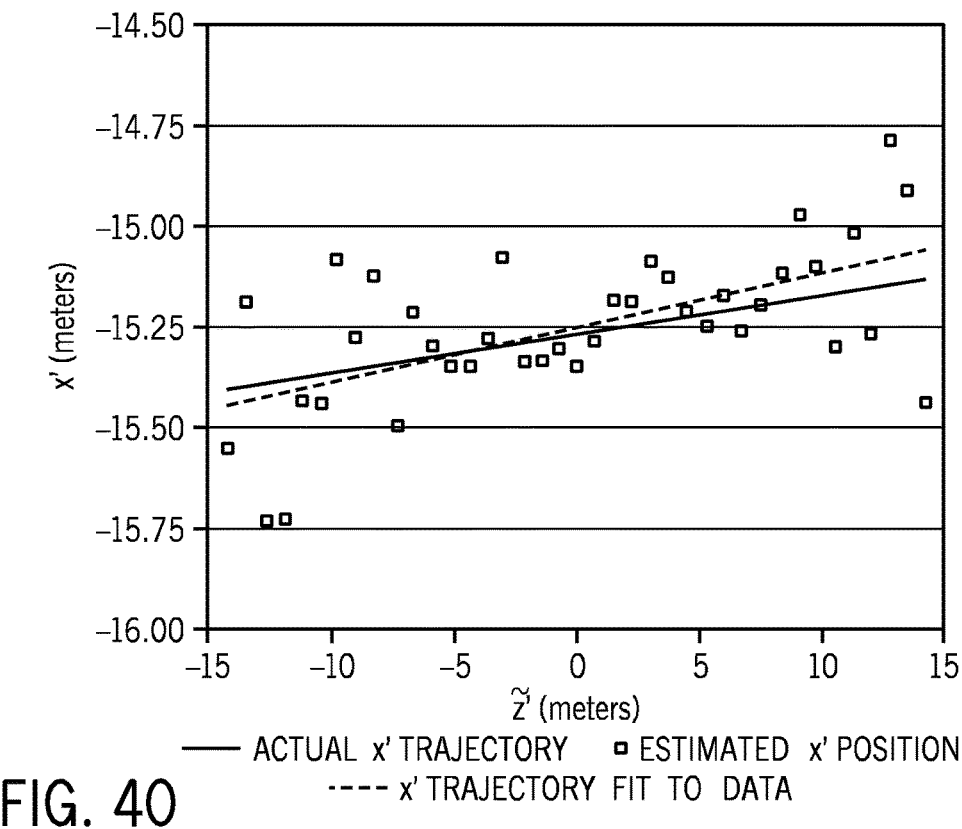
FIGS. 40 and 41 include least squares fits of estimated positioning data in accordance with exemplary embodiments.

To illustrate how to acquire direction and inclination data from the magnetometer array, data from the third example may be used as set forth below. Indeed, FIG. 40 is a plot of the estimated $\widetilde{x'}$ positions versus the estimated $\tilde{z}$ positions derived from a pair of magnetometer readings. The actual trajectory (which was used to initially calculate the magnetic field components) is shown as a solid line. The estimated $\widetilde{x'}$ positions consist of a set of n data points. This set of data points can be least squares fit to a straight line over the 30 m length $$f(\tilde{z}') = a + b\tilde{z}, \qquad \text{(eq. 55)}$$

where a and b are the offset and slope. The a and b are found by minimizing the quantity $$\chi^2 = \sum_{j=1}^{n} \{\tilde{x}'(j) - f(\tilde{z}'(j))\}^2 \qquad \text{(eq. 57)}$$

where $\widetilde{x}'(j)$ and $\widetilde{z}(j)$ are the $j^{th}$ data points. For this example, minimizing $\chi^2$ results in a=−15.26 m and b=0.0130. The dashed line in FIG. 40 is equation (56) fit to the data. From the slope of this line, the inclination of the second well relative to the first well is estimated by least squares to be 0.7° while the true inclination is 0.5°.

Figure 41:
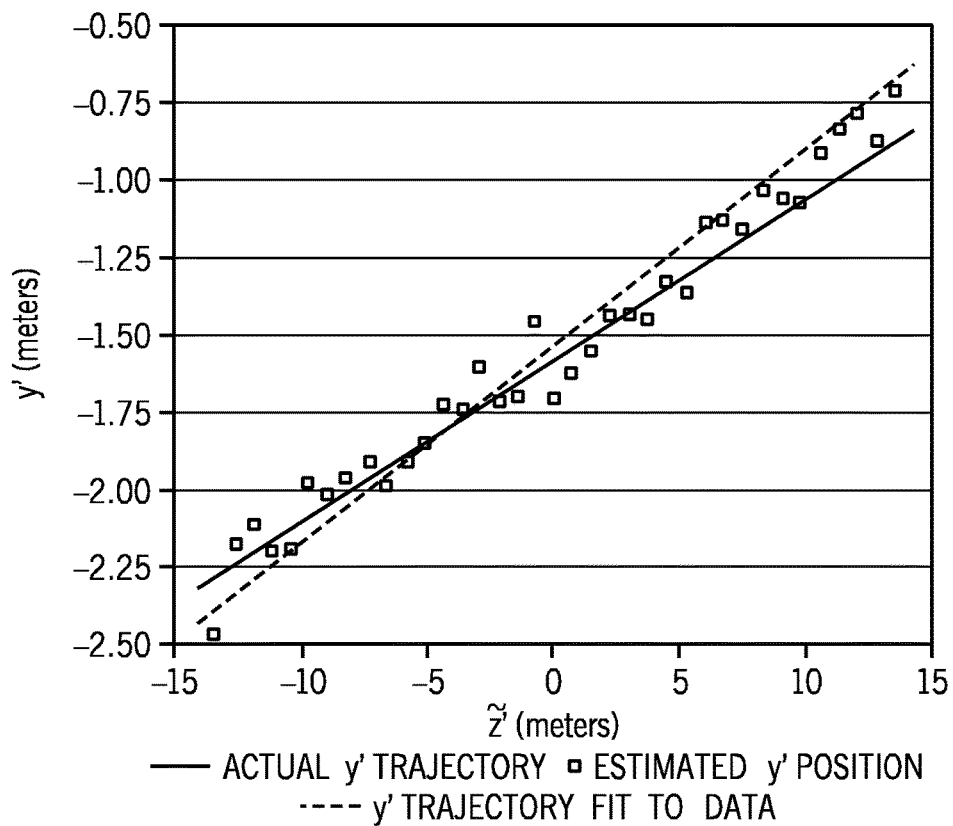

FIG. 41 is a plot of the estimated $\widetilde{y}$ positions versus the estimated $\widetilde{z}$ positions. The actual trajectory is shown as a solid line. This set of data points can be least squares fit to a straight line $$g(\widetilde{z}) = c + d\widetilde{z} \qquad (eq. 58)$$

where c and d are the offset and slope. These are found by minimizing the quantity $$\chi^2 = \sum_{j=1}^{n} \{\widetilde{y}'(j) - g(\widetilde{z}'(j))\}^2 \qquad (eq. 59)$$

where $\widetilde{y}(j)$ is the $j^{th}$ data point. Applying this to the data in FIG. 40 results in c=−1.54 m and d=0.0632. The dashed line in FIG. 41 is the fit to the data. In this example, the direction of the second well relative to the first well is thus estimated to be 3.6° from the least squares fit while the true direction is 3.0°.

Hence, the direction and inclination of the second well has been obtained from a set of measurements made in the first well. Also, by fitting several data points to a straight line, the uncertainties in the x' and y' coordinates of the solenoid are significantly reduced compared to the uncertainty in any single data point. In practice, a moving window over the measurements can be used to calculate the direction, inclination, and (x',y' z') coordinates of the solenoid. One does not have to complete drilling the interval between two magnetometers to perform a least squares fitting of the data. Data from the previous pairs of magnetometers can also be used in the moving window. In this manner accurate position, direction, and inclination measurements can be made using only the data from the magnetometer array in accordance with exemplary embodiments.

In one embodiment, for example, once the x' and y' trajectories have been obtained from equations (56) to (59), the magnetic field can be calculated using equations (15), (16), and (17). The results can be compared to the measured magnetic field components as a quality control indicator. Alternatively, equations (15), (16), and (17) can be least squares fit to the measured magnetic fields, with the assumption of piecewise linear trajectories over short distances.

Exemplary embodiments are also directed to automated control of the BHA trajectory. The systems and methods described above facilitate determining the position and direction of a BHA from measurements made by an array of magnetometers in an adjacent wellbore. These capabilities provide the basis for a system that can automatically measure the direction and position of a BHA and then control the BHA direction and inclination.

Figure 42:
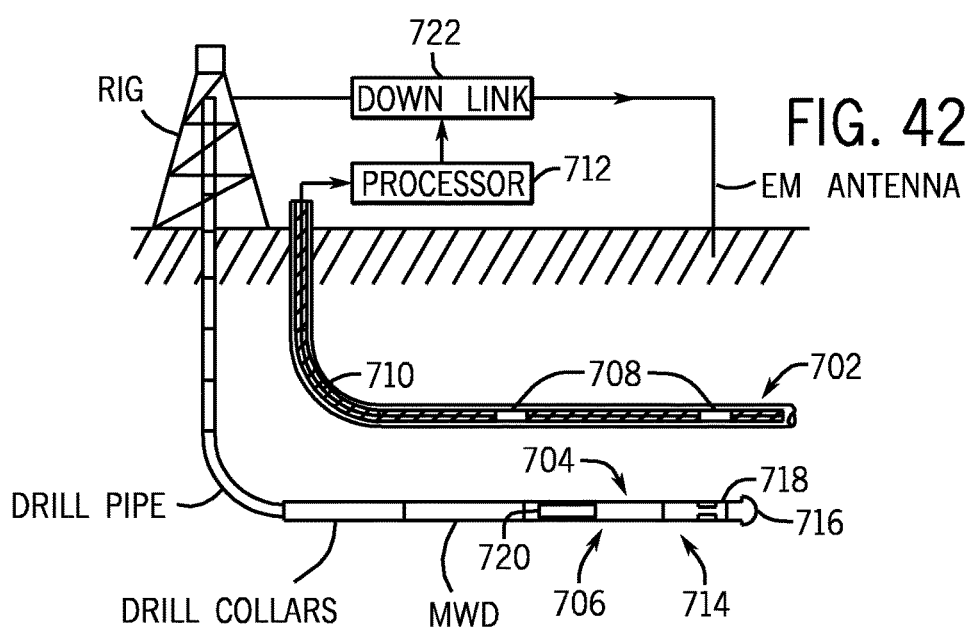
FIG. 42 is a diagram of a pair of wells in a formation, wherein a first well has been completed and a second well is in the process of being drilled by a drilling tool in accordance with exemplary embodiments.

FIG. 42 is a diagram of a pair of wells in a formation, wherein a first well 702 has been completed and a second well 704 is in the process of being drilled by a drilling tool 706 in accordance with an exemplary embodiment. A magnetometer array 708 is disposed in the first well 702 and connected to the surface by a telemetry function, such as a wireline cable 710. The magnetometer measurements are fed into a processor 712. The second well contains a BHA 714 with a drill bit 716, a steerable system 718 (such as a rotary steerable system), and a solenoid 720. In addition, there is a down link system 722 that can send surface commands to the steerable system 718.

In operation, the solenoid 720 may be periodically activated with a low frequency current, which produces an AC magnetic field. For example, the solenoid 720 might transmit for a period of 1 minute every 3 minutes. The alignment of the solenoid 720 with the borehole axis, and the rotational symmetry of the magnetic field allows for the continuous acquisition of data while rotating the BHA 714. The three components of the magnetic field are measured by at least two adjacent magnetometers 708. These magnetometers measurements are transmitted to the surface (e.g. by wireline 710) and fed into the processor 712. The processor 712 may contain the trajectory information for the first well 702 and the depth, separation, inclination and gravity tool face for the magnetometers 708 being utilized by the magnetometer array 708 (e.g., the two magnetometers nearest the solenoid 720). The processor 712 may then execute the algorithms described by equations (19) through (55) to determine the instantaneous position of the solenoid 720 in the BHA 714, and compares the solenoid's position to the planned trajectory for the second well 704.

The processor 712 may also compute a least squares fit of a sequence of estimated positions $\{\widetilde{x}', \widetilde{y}, \widetilde{z}\}$ to piecewise linear trajectories using equations (56) to (59). This may utilize a sliding window encompassing a specified distance of drilled depth, for example. The processor obtains the direction and inclination of the BHA 714 from the least squares fits, and also obtains a more precise determination of the solenoid's position.

The processor 712 may then compare the position, direction and inclination of the BHA 714 to the planned trajectory and determine whether the corrections need to be made to the steerable system 718. The processor data bank may contain the maximum permissible deviation from the well plan which determines if course correction is necessary. If necessary, the processor 712 may calculate the course corrections.

The processor 712 may send a command to a down link system 722. One example of a downlink system 722 is an electromagnetic telemetry system, such as E-Pulse™ available from Schlumberger. The down link system generates a low frequency electric current that is transmitted into the Earth by an EM antenna, and this produces a voltage across the insulated gap of an EM telemetry tool. Down link commands can be sent in a few seconds from surface to the EM MWD tool. The EM telemetry tool can then pass the down linked command to a rotary steerable system, such as PowerDrive, with a short hop telemetry such as that described in patent application US20070247330 A1, "Wireless electromagnetic telemetry system and method for bottomhole assembly", by the same inventor and assigned to SCHLUMBERGER TECHNOLOGY CORP.

The rotary steerable system 718, having received the down-linked command, may adjust the trajectory accordingly to return to the planned trajectory. The down linked command typically directs the rotary steerable system 718 to drill straight, or to drill a curve with specified build-rate, direction, and inclination.

As described, the entire process may be done without the requirement of human intervention. It can be operated as a closed loop feedback system with human oversight. Various steps in the process, such as computing the corrections and generating the steering correction can of course be done by wellsite personnel in accordance with an exemplary embodiment. However, automated computing may be more efficient. It should be noted that the automated method described above in accordance with an exemplary embodiment may be applied to any pair of wells, and is not limited to SAGD applications. The two wells may be non-parallel in general, and may even be perpendicular. Furthermore, an exemplary embodiment may be used with the magnetometers deployed on a wireline or coiled tubing string, in addition to being mounted in a BHA.

Present embodiments may be more efficient than conventional techniques for magnetic ranging, such as that described with respect to FIG. 1. For example, present embodiments may facilitate efficient acquisition of magnetic ranging surveys and increase the accuracy of measurements. Indeed, it is now recognized that two or more magnetometers or other magnetic field sensor subsystems in a fixed or substantially fixed orientation (e.g., positioned a certain distance apart) may be utilized to make measurements without having to move a magnetic field source, such as a solenoid, to acquire location data. It has been recognized that this may reduce errors by avoiding errors in measuring the two axial positions of the solenoid and errors in the distance the solenoid moves. Further, present embodiments may facilitate calculations that occur downhole, and, thus, conserve rig time by avoiding delays associated with transmitting data to the surface for calculation. Present embodiments may also facilitate automation of all or a substantial portion of the entire process for determining the position of a BHA from an adjacent well and steering it to follow a planned well trajectory.

While only certain features of the invention have been illustrated and described herein, many modifications and changes will occur to those skilled in the art. For example, although the invention has been described involving a dual magnetometers and a wireline, the magnetometers could also be deployed in any of various tools, such as an MWD too, a coiled tubing tool, or in a slick line. It is, therefore, to be understood that the appended claims are intended to cover all such modifications and changes as fall within the true spirit of the invention.

What is claimed is:

1. A method for determining a geometric relationship of a second well with respect to a first well, comprising the steps of:
   producing a first output from a first 3-axis magnetometer positioned in the second well, the first output responsive to a magnetic field produced by a magnetic field source positioned in the first well;
   producing a second output from a second 3-axis magnetometer positioned in the second well, the second output responsive to the magnetic field produced by the magnetic field source, wherein a location of the first 3-axis magnetometer and a location of the second 3-axis magnetometer relative to the magnetic field source are unknown;
   calculating the location for each of the first and second magnetometers in the second well with respect to the magnetic field source in the first well; wherein the location of the first magnetometer and the location of the second magnetometer are determined from a plurality of magnetic field components measured by each said magnetometer;
   transmitting the locations of the first and second 3-axis magnetometers to surface;
   determining the geometric relationship of the second well with respect to the first well; and
   reinitiating drilling operations based on the geometric relationship between the first and second wells.

2. The method of claim 1, wherein producing the first and second outputs with the first and second 3-axis magnetometers comprises producing the first and second outputs based on sensing x, y, and z orthogonal magnetic field components of the magnetic field in the first well.

3. The method of claim 1, wherein the first and second outputs each comprise sensed x, y and z magnetic field components responsive to the magnetic field produced by the magnetic field source.

4. The method of claim 1, comprising activating the magnetic field source by implementing AC energizing of the magnetic field source.

5. The method of claim 1, further comprising providing the first and second 3-axis magnetometers within the second well as components of a single downhole tool.

6. The method of claim 1, comprising determining the geometric relationship of the second well with respect to the first well, wherein a distance determination is performed in a region where the first and second wells are generally parallel, and wherein determining the geometric relationship of the second well with respect to the first well comprises determining, in the region, a radial distance and a direction with respect to the first well.

7. The method of claim 1, comprising producing the magnetic field with a solenoid disposed in a drilling tool.

8. The method of claim 1, comprising producing the magnetic field with a solenoid disposed on a wireline cable.

9. A method for drilling of a second well in a specified spatial relationship with respect to a first well, comprising the steps of:
   providing, in the first well, a magnetic field source;
   providing, in the second well, a directional drilling subsystem and a plurality of magnetometers for sensing directional magnetic field components wherein an axis of the second well is defined by a location of each of at least two of the magnetometers, wherein the locations of the magnetometers in the second well relative to the magnetic field source are unknown;
   activating the magnetic field source to produce a magnetic field;
   producing at least two outputs from the plurality of magnetometers, wherein each of the at least two outputs is produced by a different one of the plurality of magnetometers, the at least two outputs being responsive to the magnetic field produced by the magnetic field source wherein the magnetometers are positioned within the second well at known distance D apart from one another and individually measure the magnetic field components created by the magnetic field source positioned in the first well, wherein the magnetic field components determine the location of the magnetic field source relative to the magnetometers;
   transmitting the locations of the magnetometers to surface;
   determining a geometric relationship of the second well with respect to the first well as a function of the at least two outputs and the distance D;
   producing directional drilling control signals as a function of the determined geometric relationship; and
   implementing a directional drilling increment of the second well in the directional drilling subsystem with the directional drilling control signals.

10. The method of claim 9, comprising implementing a further directional drilling increment of the second well using data acquired at an advanced location of the magnetic field source within the first well.

11. The method of claim 9, comprising measuring direction, inclination, and gravity tool face of the directional drilling subsystem, and wherein the directional drilling control signals are a function of the measured direction, inclination, and gravity tool face in addition to being a function of the determined geometric relationship.

12. A system for monitoring a geometric relationship of a second well with respect to a first well, comprising:
a sensing subsystem capable of being positioned in the second well, the sensing subsystem comprising a plurality of spaced apart magnetometer systems capable of sensing directional magnetic field components, wherein each of the plurality of magnetometer systems is capable of producing an output responsive to a magnetic field produced by a magnetic field source located on an axis of the first well, wherein each magnetometer system comprises at least one magnetometer, an inclinometer, an analog-to-digital converter, and a processing unit capable of acquiring and processing data, wherein the magnetometers are spaced apart from one another a known distance D within the second well, a location of each of the magnetometers relative to the magnetic field source is unknown, and a location for each magnetometer is calculated with respect to the axis of the first well; and
the processing unit is capable of determining the geometric relationship of the second well with respect to the first well from the locations of the magnetometers transmitted to the processing unit.

13. The system of claim 12, comprising a magnetic field subsystem capable of being moved along the first well, the magnetic field subsystem comprising the magnetic field source capable of producing the magnetic field.

14. The system of claim 13, wherein the magnetic field subsystem comprises a solenoid mounted in a drill collar.

15. A system for magnetic ranging to an open borehole or to a cased well, comprising:
a magnetic field source capable of being located in a first borehole;
an array of magnetometer systems capable of being located in a second borehole, wherein the magnetometer systems are located a known distance apart along the array and are each capable of measuring a magnetic field generated by the magnetic field source, each magnetometer system comprises a plurality of magnetometers, each magnetometer is positioned within the second borehole at known distance D from another and individually measure the magnetic field created by the magnetic field source positioned in the first borehole and a location of each of the magnetometers is unknown relative to the location of the magnetic field source and the location of each of the magnetometers is calculated from a plurality of magnetic field components measured by each of the magnetometers; and
a processor capable of calculating a location of the magnetic field source based on the known distance and measurements taken by a pair of magnetometer systems within the array that are within a threshold distance of the magnetic field source wherein the locations of the magnetometers are transmitted to the processor.

* * * * *